(12) United States Patent
Lasserre et al.

(10) Patent No.: US 12,439,085 B2
(45) Date of Patent: Oct. 7, 2025

(54) CLOUD GEOMETRY DATA SENSED BY AT LEAST ONE SENSOR

(71) Applicant: Beijing Xiaomi Mobile Software Co., Ltd., Beijing (CN)

(72) Inventors: Sebastien Lasserre, Beijing (CN); Jonathan Taquet, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 65 days.

(21) Appl. No.: 18/695,699

(22) PCT Filed: Jun. 30, 2022

(86) PCT No.: PCT/CN2022/103142
§ 371 (c)(1),
(2) Date: Mar. 26, 2024

(87) PCT Pub. No.: WO2023/050951
PCT Pub. Date: Apr. 6, 2023

(65) Prior Publication Data
US 2024/0406442 A1    Dec. 5, 2024

(30) Foreign Application Priority Data
Sep. 30, 2021 (EP) .................................. 21306362

(51) Int. Cl.
*H04N 19/597* (2014.01)
*H04N 19/105* (2014.01)
*H04N 19/169* (2014.01)

(52) U.S. Cl.
CPC ......... *H04N 19/597* (2014.11); *H04N 19/105* (2014.11); *H04N 19/1883* (2014.11)

(58) Field of Classification Search
CPC ............ H04N 19/105; H04N 19/1883; H04N 19/597; H04N 19/90; H04N 19/00
(Continued)

(56) References Cited

U.S. PATENT DOCUMENTS

2022/0210472 A1* 6/2022 Gao ...................... H04N 19/597
2024/0185466 A1* 6/2024 Taquet .................... G06T 9/004
(Continued)

OTHER PUBLICATIONS

European Patent Office, Extended European Search Report issued in Application No. 21306362.1 dated Mar. 24, 2022, 12 pages.
(Continued)

*Primary Examiner* — Behrooz M Senfi
(74) *Attorney, Agent, or Firm* — Finnegan, Henderson, Farabow, Garrett & Dunner, L.L.P.

(57) ABSTRACT

A method of encoding, into a bitstream, point cloud geometry data sensed by at least one sensor associated with a sensor index, includes: obtaining a list of candidate radiuses ($L=\{r_2\}$) for a first occupied coarse point ($P_1$) having a first sensor index ($\lambda_1$), a first sample index ($s_1$) and being associated with a first radius ($r_1$); selecting, for the first occupied coarse point ($P_1$), a selected predicting radius ($r_{pred}$) from the list of candidate radiuses ($L=\{r_2\}$); encoding, in the bitstream, a data ($I_{pred}$) representative of the selected predicting radius ($r_{pred}$) in the list of candidate radiuses ($L=\{r_2\}$); and predictively encoding, in the bitstream, a residual radius ($r_{res}$) between the first radius ($r_1$) and the selected predicting radius ($r_{pred}$).

20 Claims, 19 Drawing Sheets

(58) Field of Classification Search
USPC .................................................. 375/240.26
See application file for complete search history.

(56) References Cited

U.S. PATENT DOCUMENTS

| | | | |
|---|---|---|---|
| 2024/0305821 A1* | 9/2024 | Lasserre | G06T 9/001 |
| 2024/0414370 A1* | 12/2024 | Lasserre | G06T 9/001 |
| 2025/0071325 A1* | 2/2025 | Gao | G06T 9/40 |
| 2025/0139833 A1* | 5/2025 | Lasserre | G06T 9/001 |
| 2025/0220220 A1* | 7/2025 | Hur | H04N 19/577 |

OTHER PUBLICATIONS

S. Lasserre, J. Taquet, "m57073 [GPCC-EE13.53] Algorithmic explanation of the new Lidar Codec LL-LC2", Xiaomi, Oct. 6, 2021, 37 pages.

ISO/IEC JTC 1/SC 29/WG 7, N00167, MPEG 3D Graphics Coding, Convenorship: AFNOR (France), "Technologies under Consideration in G-PCC", https://isotc.iso.org/livelink/livelink/open/jtc1sc29wg7, Aug. 31, 2021, 44 pages.

* cited by examiner

CLOUD GEOMETRY DATA SENSED BY AT LEAST ONE SENSOR

CROSS-REFERENCE TO RELATED APPLICATIONS

This application is a US national stage application of International Application No. PCT/CN2022/103142, filed on Jun. 30, 2022, which claims priority to European Patent Application No. 21306362.1 filed on Sep. 30, 2021, the entire content of which is hereby incorporated by reference.

FIELD

The present disclosure generally relates to point cloud compression and, in particular to methods and apparatus of encoding/decoding point cloud geometry data sensed by at least one sensor.

BACKGROUND

The present section is intended to introduce the reader to various aspects of art, which may be related to various aspects of at least one embodiments of the present disclosure that is described and/or claimed below. This discussion is believed to be helpful in providing the reader with background information to facilitate a better understanding of the various aspects of the present disclosure.

As a format for the representation of 3D data, point clouds have recently gained traction as they are versatile in their capability in representing all types of physical objects or scenes. Point clouds may be used for various purposes such as culture heritage/buildings in which objects like statues or buildings are scanned in 3D in order to share the spatial configuration of the object without sending or visiting it. Also, it is a way to ensure preserving the knowledge of the object in case it may be destroyed; for instance, a temple by an earthquake. Such point clouds are typically static, colored and huge.

Another use case is in topography and cartography in which using 3D representations allow for maps that are not limited to the plane and may include the relief. Google Maps is now a good example of 3D maps but uses meshes instead of point clouds. Nevertheless, point clouds may be a suitable data format for 3D maps and such point clouds are typically static, colored and huge.

Virtual Reality (VR), Augmented Reality (AR) and immersive worlds have recently become a hot topic and are foreseen by many as the future of 2D flat video. The basic idea is to immerse the viewer in a surrounding environment, in contrast to a standard TV that only allows the viewer to look at the virtual world in front of him/her. There are several gradations in the immersivity depending on the freedom of the viewer in the environment. A point cloud is a good format candidate for distributing VR/AR worlds.

The automotive industry, and more particularly foreseen autonomous cars, are also domains in which point clouds may be intensively used. Autonomous cars should be able to "probe" their environment to make good driving decisions based on the detected presence and nature of their immediate nearby objects and road configuration.

A point cloud is a set of points located in a three-dimensional (3D) space, optionally with additional values attached to each of the points. These additional values are usually called attributes. Attributes may be, for example, three-component colors, material properties like reflectance and/or two-component normal vectors to a surface associated with a point.

A point cloud is thus a combination of geometry data (locations of the points in a 3D space usually represented by 3D cartesian coordinates x, y and z) and attributes.

Point clouds may be sensed by various types of devices like an array of cameras, depth sensors, lasers (light detection and ranging, also known as Lidars), radars, or may be computer-generated (for example in movie post-production). Depending on the use cases, points clouds may have from thousands to up to billions of points for cartography applications. Raw representations of point clouds require a very high number of bits per point, with at least a dozen of bits per cartesian coordinate x, y or z, and optionally more bits for the attribute(s), for instance three times 10 bits for the colors.

It is important in many applications to be able to either distribute point clouds to an end-user or store them in a server by consuming only a reasonable amount of bitrate or storage space, while maintaining an acceptable (or very good) quality of experience. Efficient compression of these point clouds is a key point in order to make the distribution chain of many immersive worlds practical.

Compression may be lossy (like in video compression) for the distribution to and visualization by an end-user, for example on AR/VR glasses or any other 3D-capable device. Other use cases do require lossless compression, like medical applications or autonomous driving, to avoid altering the results of a decision obtained from the subsequent analysis of the compressed and transmitted point cloud.

Until recently, point cloud compression (aka PCC) was not addressed by the mass market and no standardized point cloud codec was available. In 2017, the standardization working group ISO/JCT1/SC29/WG11, aka Moving Picture Experts Group or MPEG, initiated work items on point cloud compression. This has led to two standards, namely MPEG-I part 5 (ISO/IEC 23090-5) or Video-based Point Cloud Compression (aka V-PCC)

MPEG-I part 9 (ISO/IEC 23090-9) or Geometry-based Point Cloud Compression (aka G-PCC)

The V-PCC coding method compresses a point cloud by performing multiple projections of a 3D object to obtain 2D patches that are packed into an image (or a video when dealing with dynamic point clouds). Obtained images or videos are then compressed using already existing image/video codecs, allowing for the leverage of already deployed image and video solutions. By its very nature, V-PCC is efficient only on dense and continuous point clouds because image/video codecs are unable to compress non-smooth patches as would be obtained from the projection of, for example, Lidar-sensed sparse geometry data.

The G-PCC coding method has two schemes for the compression of a sensed sparse geometry data.

The first scheme is based on an occupancy tree, being locally any type of tree among octree, quadtree or binary tree, representing the point cloud geometry. Occupied nodes (i.e. a node associated with a cube/cuboid comprising at least one point of the point cloud) are split down until a certain size is reached, and occupied leaf nodes provide the 3D locations of points, typically at the center of these nodes. The occupancy information is carried by occupancy data (binary data, flag) signaling the occupancy status of each of the child nodes of nodes. By using neighbor-based prediction techniques, high level of compression of the occupancy data can be obtained for dense point clouds. Sparse point clouds are also addressed by directly coding the position of point within a node with non-minimal size, by stopping the tree construction when only isolated points are present in a node; this technique is known as Direct Coding Mode (DCM).

The second scheme is based on a predictive tree in which each node represents the 3D location of one point and the parent/child relation between nodes represents spatial prediction from parent to children. This method can only address sparse point clouds and offers the advantage of lower latency and simpler decoding than the occupancy tree. However, compression performance is only marginally better, and the encoding is complex, relatively to the first occupancy-based method, because the encoder must intensively look for the best predictor (among a long list of potential predictors) when constructing the predictive tree.

In both schemes, attribute (de) coding is performed after complete geometry (de) coding, leading practically to a two-pass coding. Thus, the joint geometry/attribute low latency is obtained by using slices that decompose the 3D space into sub-volumes that are coded independently, without prediction between the sub-volumes. This may heavily impact the compression performance when many slices are used.

Combining together requirements on encoder and decoder simplicity, on low latency and on compression performance is still a problem that has not been satisfactory solved by existing point cloud codecs.

An important use case is the transmission of sparse geometry data sensed by at least one sensor mounted on a moving vehicle. This usually requires a simple and low latency embarked encoder. Simplicity is required because the encoder is likely to be deployed on computing units which perform other processing in parallel, such as (semi-) autonomous driving, thus limiting the processing power available to the point cloud encoder. Low latency is also required to allow for fast transmission from the car to a cloud in order to have a real-time view of the local traffic, based on multiple-vehicle acquisition, and take adequate fast decision based on the traffic information. While transmission latency can be low enough by using 5G, the encoder itself shall not introduce too much latency due to coding. Also, compression performance is extremely important since the flow of data from millions of cars to the cloud is expected to be extremely heavy.

Specific techniques related to spinning Lidar-sensed sparse geometry data have been already been exploited in G-PCC and have led to very significant gains of compression.

First, G-PCC exploits the elevation angle (relative to the horizontal ground) of sensing from a spinning Lidar head 10 as depicted on FIGS. 1 and 2. A Lidar head 10 comprises a set of sensors 11 (for example lasers), here five sensors are represented. The spinning Lidar head 10 may spin around a vertical axis z to sense geometry data of a physical object. Lidar-sensed geometry data is then represented in spherical coordinates $(r_{3D}, \phi, \theta)$, where $r_{3D}$ is the distance of a point P from the Lidar head's center, $\phi$ is an azimuthal angle of the Lidar head's spin relative to a referential, and $\theta$ is an elevation angle of a sensor k of the spinning Lidar head 10 relative to a horizontal referential plane.

A regular distribution along the azimuthal angle has been observed on Lidar-sensed data as depicted on FIG. 3. This regularity is used in G-PCC to obtain a quasi 1D representation of the point cloud where, up to noise, only a radius $r_{3D}$ belongs to a continuous range of values while the angles $\phi$ and $\theta$ take only a discrete number of values $\phi_i, \forall i=0$ to I−1 where I is a number of azimuthal angles used for the sensing of the points and $\theta_j, \forall j=0$ to J−1 where J is a number of sensors of the spinning Lidar head 10. Basically, G-PCC represents Lidar-sensed sparse geometry data on a two-dimensional (discrete) angular coordinate space $(\phi,\theta)$ as depicted on FIG. 3, together with a radius value $r_{3D}$ for each point.

This quasi 1D property has been exploited in G-PCC in both the occupancy tree and the predictive tree by predicting, in the spherical coordinate space, the location of a current point based on a precedingly coded point by using the discrete nature of angles.

More precisely, the occupancy tree uses DCM intensively and entropy codes the direct locations of points within a node by using a context-adaptive entropy coder. Contexts are then obtained from the local conversion of the point locations into angular coordinates $(\phi,\theta)$ and from the location of these angular coordinates relative to discrete angular coordinates $(\phi_i, \theta_j)$ obtained from precedingly coded points. The predictive tree directly codes a first version of a point location in the angular coordinates $(r_{2D}, \phi, \theta)$, where $r_{2D}$ is the projected radius on the horizontal xy plane as depicted on FIG. 4, using the quasi 1D nature $(r_{2D}, \phi_i, \theta_j)$ of this angular coordinate space. Then, spherical coordinates $(r_{2D}, \phi, \theta)$ are converted into 3D cartesian coordinates (x,y,z) and a xyz residual is coded to tackle the errors of coordinate conversion, the approximation of elevation and azimuthal angles and potential noise.

G-PCC does use the angular priors to better compress spinning Lidar-sensed sparse geometry data but does not adapt the coding structure to the order of sensing. By its very nature, the occupancy tree must be coded down to its last depth before outputting a point. This occupancy data is coded in the so-called breadth-first order: the occupancy data of the root node is first coded, indicating its occupied child nodes; then the occupancy data for each of the occupied child nodes is coded, indicating the occupied grand-child nodes; and so on iteratively over the tree depth until leaf nodes can be determined and the corresponding points are provided/output to an application or to the attribute(s) coding scheme. Regarding the predictive tree, the encoder is free to choose the order of point in the tree, but to obtain good compression performance, to optimize the prediction accuracy, G-PCC proposes to code one tree per sensor. This has mainly the same drawback as using one coding slice per sensor, i.e. non-optimal compression performance because prediction between sensors is not allowed and does not provide encoder low latency. Worse, one should have one coding processing per sensor and the number of core coding units should equal the number of sensors; this is not practical.

In brief, in a framework of a spinning sensors head used for sensing sparse geometry data of a point cloud, related arts do not solve the problem of combining encoding and decoding simplicity, low latency and compression performance.

Moreover, sensing sparse geometry data of point cloud by using spinning sensors head has some drawbacks and other types of sensor head may be used.

The mechanical parts generating the spin (rotation) of a spinning sensors head are prone to breakage and are costly. Also, by construction, the angle of view is necessarily 2π. This does not allow to sense a particular region of interest with high frequency, for instance it may be more interesting to sense in front of a vehicle than behind. Practically in most cases, when a sensor is attached to a vehicle, most of the 2π angle of view is screened by the vehicle itself and the screened angle of view does not need to be sensed.

New types of sensors have emerged recently, allowing for a more flexible selection of the region to be sensed. In most recent designs, a sensor can be more freely and electronically (thus avoiding fragile mechanical parts) moved to obtain a large variety of sensing path in the 3D scene as depicted on FIG. 5. On FIG. 5, a set of four sensors is shown. Their relative sensing directions, i.e. azimuthal and elevation angles, are fixed relative to each other, however they overall sense a scene following a programmable sensing path depicted by dashed lines on the two-dimensional angular coordinate ($\phi,\theta$) space. Points of the point cloud may then be sensed regularly along the sensing path. Some sensor head may also adapt their sensing frequency by increasing their sensing frequency when a region of interest R has been detected as illustrated on FIG. 6. Such a region of interest R may be associated with a close object, a moving object, or any object (pedestrian, other vehicle, etc.) precedingly segmented, for instance in a previous frame, or dynamically segmented during the sensing. FIG. 7 shows schematically another example of a sensing path (typical zigzag sensing path) used by a sensor head comprising two sensors able to increase their sensing frequencies when a region of interest has been detected (grey shaded points and grey hashed points). Using a zigzag sensing path may be advantageously used to sense a limited (azimuthal) angular sector of a 3D scene. Because sensors may be attached to a vehicle, their viewports of interest are necessarily limited by the presence of the vehicle itself that obstructs the scene, unless the sensors are located at the top of the car. Consequently, sensors with a limited probing angular sector are of high interest and easier to integrate to a vehicle.

As depicted on FIG. 8, a sensor head comprising a single sensor may also be used to sense multiple positions (two vertical positions on FIG. 8), for instance using reflections on mirrors oscillating with rotations (here vertical rotations). In that case, instead of using a set of sensors, a single sensor at different angular positions (i.e. with different elevation angle on FIG. 8) along a sensing path (here a zigzag sensing path) is used mimicking a sensing using a set of multiple sensors.

For the sake of simplicity, in the following descriptions and claims, the "sensor head" may refer to a set of physical sensors or a set of sensing elevation indexes mimicking a set of sensors as well. Also, one skilled in the art will understand that "a sensor" could also refer to a sensor in each sensing elevation index position.

Combining together requirements on encoder and decoder simplicity, on low latency and on compression performance of point cloud sensed by any type of sensors is still a problem that has not been satisfactory solved by existing point cloud codecs.

At least one embodiment of the present disclosure has been devised with the foregoing in mind.

SUMMARY

According to a first aspect of the present disclosure, there is provided a method of encoding, into a bitstream, point cloud geometry data sensed by at least one sensor associated with a sensor index, the point cloud geometry data being represented by ordered coarse points occupying some discrete positions of a set of discrete positions of a two-dimensional space, each occupied coarse point is located within the two-dimensional space by a sensor index associated with a sensor that sensed a point of the point cloud associated with the occupied coarse point, and a sample index associated with a sensing time instant at which the point of the point cloud has been sensed, each occupied coarse point is associated with a radius based on a distance of the point of the point cloud from a referential. The method comprises obtaining a list of candidate radiuses for a first occupied coarse point having a first sensor index, a first sample index and being associated with a first radius, the list of candidate radiuses comprises at least one second radius associated with at least one second occupied coarse point having a second sensor index different from the first sensor index and having a second sample index lower than or equal to the first sample index, the at least one second occupied coarse point further fulfilling at least one eligibility condition indicating that the radius associated with the at least one second occupied coarse point is likely reducing a dynamic of a predictive residual radius ($r_{res}$) when the first radius is predictive encoded; selecting, for the first occupied coarse point, a selected predicting radius from the list of candidate radiuses; encoding, in the bitstream, a data representative of the selected predicting radius in the list of candidate radiuses; and predictive encoding, in the bitstream, a residual radius between the first radius and the selected predicting radius.

According to a second aspect of the present disclosure, there is provided a method of decoding, from a bitstream, point cloud geometry data sensed by at least one sensor associated with a sensor index, the point cloud geometry data being represented by ordered coarse points occupying some discrete positions of a set of discrete positions of a two-dimensional space, each occupied coarse point is located within the two-dimensional space by a sensor index associated with a sensor that sensed a point of the point cloud associated with the occupied coarse point, and a sample index associated with a sensing time instant at which the point of the point cloud has been sensed, each occupied coarse point is associated with a radius based on a distance of the point of the point cloud from a referential. The method comprises: obtaining a list of candidate radiuses for a first occupied coarse point having a first sensor index and a first sample index and being associated with a first radius, the list of candidate radiuses comprises at least one second radius associated with at least one second occupied coarse point having a second sensor index different of the first sensor index and having a second sample index lower than the first sample index, the at least one second occupied coarse point further fulfilling at least one eligibility condition indicating that a radius associated with the at least one second occupied coarse point is promising for reducing a dynamic of a predictive residual radius when the first radius is predictive encoded; decoding, from the bitstream, for a first occupied coarse point, a data representative of a selected predicting radius in the list of candidate radiuses; decoding, from the bitstream, for the first occupied coarse point, a residual radius; and obtaining a radius associated with a point of the point represented by the first occupied coarse point, based on the residual radius and the selected predicting radius is obtained from the data and the list of candidate radiuses.

In one embodiment, the list of candidate radiuses further comprises at least one third radius associated with at least one third occupied coarse point having a third sensor index equal to the first sensor index and a third sample index lower than or equal to the first sample index.

In one embodiment, the eligibility condition is based on a comparison between a second sample index of a second occupied coarse point and a third sample index of a third occupied coarse point.

In one embodiment, the eligibility condition is fulfilled by the second occupied coarse point when the second sample index is greater than the third sample index.

In one embodiment, the eligibility condition is based on a comparison of azimuthal angles associated with sensors used to sense points of the point cloud associated with the first, second and third occupied coarse points.

In one embodiment, the eligibility condition is fulfilled by a second occupied coarse point when a first azimuthal angle difference is lower than a second azimuthal angle difference, the first azimuthal angle difference being a difference between a first azimuthal angle associated with the first occupied coarse point and a second azimuthal angle associated with the second occupied coarse point, and the second azimuthal angle difference being a difference between the first azimuthal angle associated with the first occupied coarse point and a third azimuthal angle associated with the third occupied coarse point.

In one embodiment, an eligibility condition is fulfilled by a second occupied coarse point when a distance is greater than a threshold, the distance being calculated between a second radius associated with the second occupied coarse point and a third radius associated with a third occupied coarse point having a third sensor index equal to the first sensor index and having a third sample index lower than or equal to the first sample index, and the threshold being based on precedingly encoded or decoded residual radius associated with occupied coarse points having sensor index equal to the first sensor index.

In one embodiment, an eligibility condition is fulfilled by a second occupied coarse point when a ratio of a gradient of radius over a gradient of sample indices estimated from at least two precedingly encoded or decoded second occupied coarse points, is greater than a threshold.

According to a third aspect of the present disclosure, there is provided an apparatus of encoding, into a bitstream, point cloud geometry data sensed by at least one sensor associated with a sensor index, the point cloud geometry data being represented by ordered coarse points occupying some discrete positions of a set of discrete positions of a two-dimensional space. The apparatus comprises one or more processors configured to carry out a method according to the first aspect of the present disclosure.

According to a fourth aspect of the present disclosure, there is provided an apparatus of decoding, from a bitstream, point cloud geometry data sensed by at least one sensor associated with a sensor index, the point cloud geometry data being represented by ordered coarse points occupying some discrete positions of a set of discrete positions of a two-dimensional space. The apparatus comprises one or more processors configured to carry out a method according to the second aspect of the present disclosure.

According to a fifth aspect of the present disclosure, there is provided a non-transitory storage medium carrying instructions of program code for executing a method according to the first aspect of the present disclosure.

According to a sixth aspect of the present disclosure, there is provided a non-transitory storage medium carrying instructions of program code for executing a method according to the second aspect of the present disclosure.

BRIEF DESCRIPTION OF THE DRAWINGS

Reference will now be made, by way of example, to the accompanying drawings which show embodiments of the present disclosure, and in which.

Similar reference numerals may have been used in different figures to denote similar components.

DESCRIPTION OF EMBODIMENTS

At least one of the embodiments is described more fully hereinafter with reference to the accompanying figures, in which examples of at least one of the embodiments are depicted. An embodiment may, however, be embodied in many alternate forms and should not be construed as limited to the examples set forth herein. Accordingly, it should be understood that there is no intent to limit embodiments to the particular forms disclosed. On the contrary, the disclosure is intended to cover all modifications, equivalents, and alternatives falling within the spirit and scope of the present disclosure.

At least one of the aspects generally relates to point cloud encoding and decoding, one other aspect generally relates to transmitting a bitstream generated or encoded and one other aspects relates to receiving/accessing a decoded bitstream.

Moreover, the present aspects are not limited to MPEG standards such as MPEG-I part 5 or part 9 that relate to the Point Cloud Compression, and may be applied, for example, to other standards and recommendations, whether pre-existing or future-developed, and extensions of any such standards and recommendations (including MPEG-I part 5 and part 9). Unless indicated otherwise, or technically precluded, the aspects described in the present disclosure may be used individually or in combination.

The present disclosure relates to encoding/decoding point cloud geometry data represented by ordered coarse points of a coarse representation occupying some discrete positions of a set of discrete positions of a two-dimensional space.

For example, in the working group ISO/IEC JTC 1/SC 29/WG 7 on MPEG 3D Graphics Coding, a new codec named L3C2 (Low-Latency Low-Complexity Codec) is being considered to improve, relative to the G-PCC codec, the coding efficiency of Lidar-sensed point clouds. The codec L3C2 provides an example of a two-dimensional representation of the points of a point cloud namely a coarse representation. A description of the code can be found in the output document of the Working Group in N00167, ISO/IEC JTC 1/SC 29/WG 7, MPEG 3D Graphics Coding, "Technologies under Consideration in G-PCC", Aug. 31 2021.

Basically, for each sensed point $P_n$ of the point cloud, a sensor index $\lambda_n$ associated with a sensor that sensed the point $P_n$ and an azimuthal angle $\phi_n$ representing a sense angle of the sensor are obtained by converting 3D cartesian coordinates $(x_n, y_n, z_n)$ representing the 3D location of the sensed point $P_n$. Points of the point cloud are then ordered based on the azimuthal angles $\phi_n$ and the sensor indices $\lambda_n$, for example, according to a lexicographic order based first on the azimuthal angle and then on the sensor index. The order index $o(P_n)$ of a point $P_n$ is then obtained by:

$$o(P_n) = \phi_n * K + \lambda_n$$

where K is the number of sensors.

Figure 9:
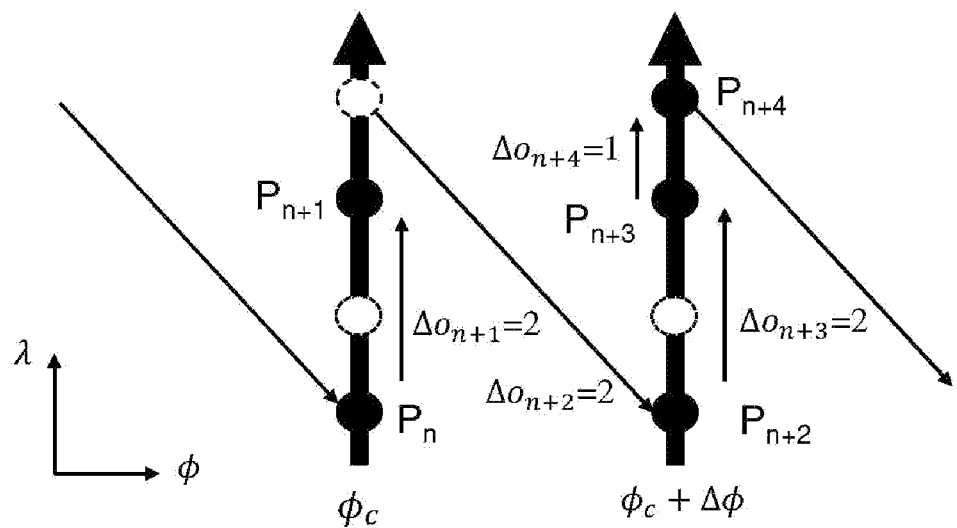
FIG. 9 shows schematically ordered coarse points of a coarse representation in accordance with at least one embodiment.

FIG. 9 shows schematically ordered coarse points of a coarse representation. Five points of the point cloud have been sensed. Each of these five points are coarsely represented by a coarse point (black point) in the coarse representation: two coarse points $P_n$ and $P_{n+1}$ represent two points of the point cloud sensed at time $t_1$ with an angular angle $\phi_c$ (among the $\phi_i$'s) and three coarse points represent three points of the point cloud sensed at time $t_2$ with an angular angle $\phi_c + \Delta\phi$. A coarse point that represents a sensed point of the point cloud is namely an occupied coarse point and coarse point that do not represent a sensed point of the point cloud is namely an unoccupied coarse point. Because the points of the point cloud are represented by occupied coarse points in the coarse representation, the order indices associated with the points of the point cloud are also the order indices associated with the occupied coarse points.

The coarse representation of the point cloud geometry data may then be defined in a two-dimensional coordinate $(\phi, \lambda)$ space.

The coarse representation may also be defined for any types of sensors head including rotating (spinning) or non-rotating sensors heads. Its definition is based on a sensing path defined from sensor characteristics in a two-dimensional angular coordinate $(\phi, \theta)$ space comprising an azimuthal coordinate $\phi$ representative of an azimuthal angle representing a sensing angle of a sensor relative to a referential and an elevation coordinate $\theta$ representative of an elevation angle of a sensor relative to a horizontal referential plane. The sensing path is used to sense the points of the point cloud according to ordered coarse points representing potential locations of sensed points of the point cloud. Each coarse point is defined from one sample index s associated with a sensing time instant along the sensing path and one sensor index $\lambda$ associated with a sensor.

Figure 10:
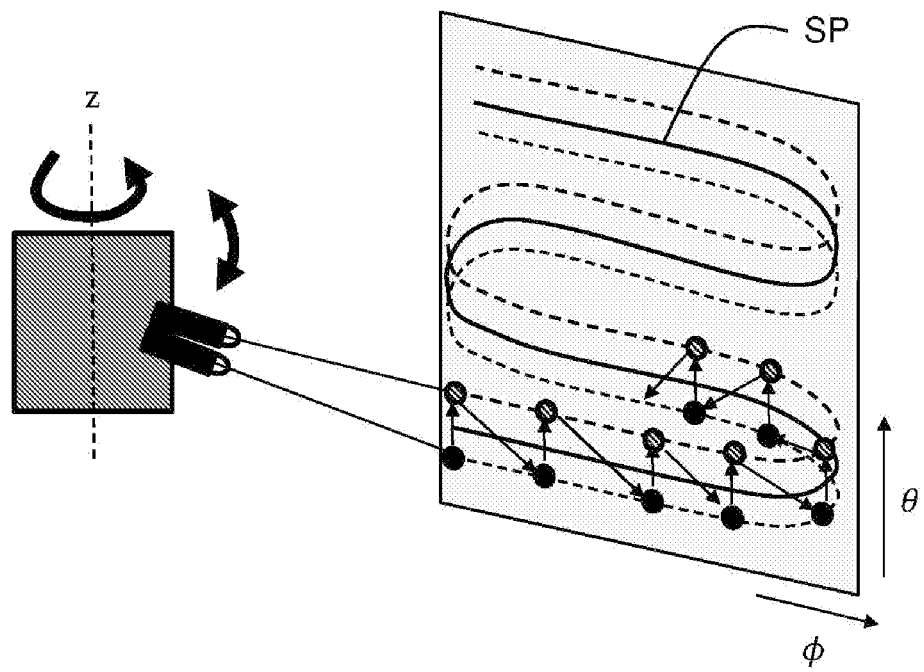
FIG. 10 shows schematically an example of an ordering of coarse points in accordance with one embodiment.
Figure 11:
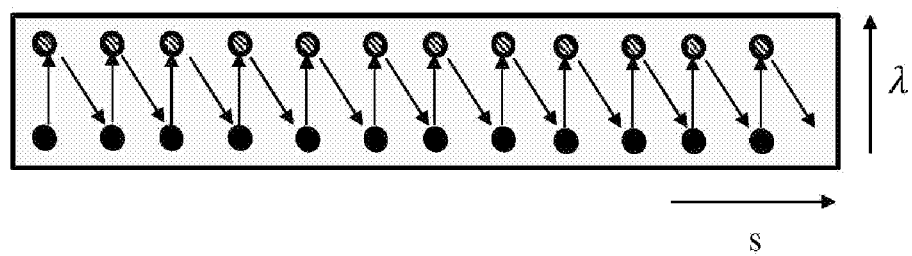
FIG. 11 shows schematically a representation of ordered coarse points in the two-dimensional coordinate $(s,\lambda)$ space.

On FIG. 10, a sensor head comprising two sensors is used. The sensing paths followed by the two sensors are represented in dash lines. For each sample index s (each sensing time instant), two coarse points are defined. The coarse points associated with the first sensor are represented by black shaded points on FIG. 10 and the coarse points associated with the second sensor are represented by a black hashed point. Each of these two coarse points belongs to a sensor sensing path (dash line) defined from the sensing path SP. FIG. 11 shows schematically a representation of ordered coarse points in the two-dimensional coordinate $(s, \lambda)$ space. Arrows on FIGS. 10 and 11 illustrate the links between two successive ordered coarse points.

An order index $o(P)$ is associated with each coarse point according to the rank of the coarse point among the ordered coarse points:

$$o(P) = \lambda + s * K$$

where K is the number of sensors of a set of sensors or the number of different positions of a single sensor for a same sample index, λ is the sensor index of the sensor that sensed the point P of the point cloud at the sensing time instant s.

Figure 12:
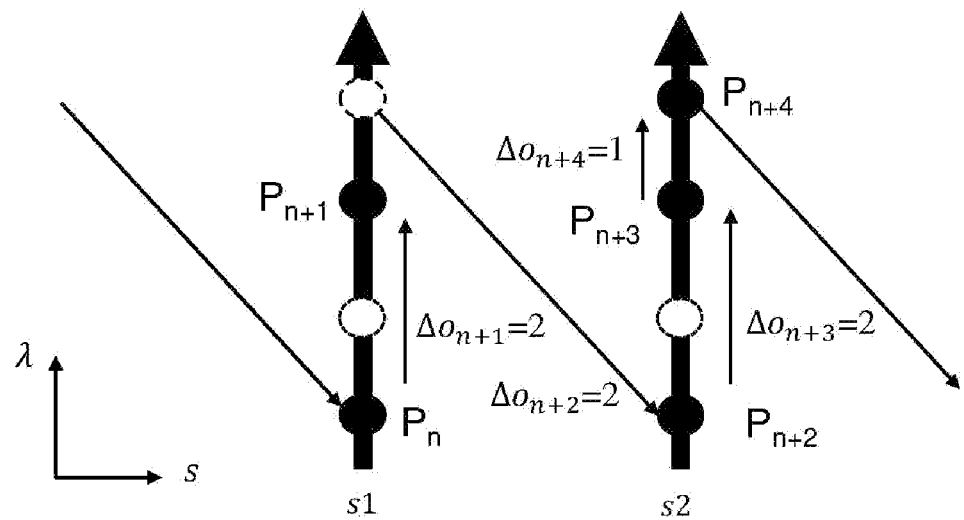
FIG. 12 shows schematically ordered coarse points of a coarse representation in accordance with at least one embodiment.

FIG. 12 illustrates ordered coarse points of a coarse representation, five occupied coarse points are represented (black circles): two coarse points $P_n$ and $P_{n+1}$ are occupied by two points of the point cloud sensed at a sensing time instant $t_1$ (corresponding to a sample index $s_1$) and three coarse points are occupied by three points of the point cloud sensed at a sensing time instant $t_2$ (corresponding to a sample index $s_2$).

The coarse representation of the point cloud geometry data may then be defined in a two-dimensional coordinate (s, λ) space.

Given the order index $o(P_1)$ of the first coarse point occupied by the first sensed point of the point cloud, and order differences Δo, one can recursively reconstruct the order index o(P) of any occupied coarse point occupied by a sensed point P of the point cloud by:

$$o(P) = o(P_{-1}) + \Delta o$$

Figure 1:
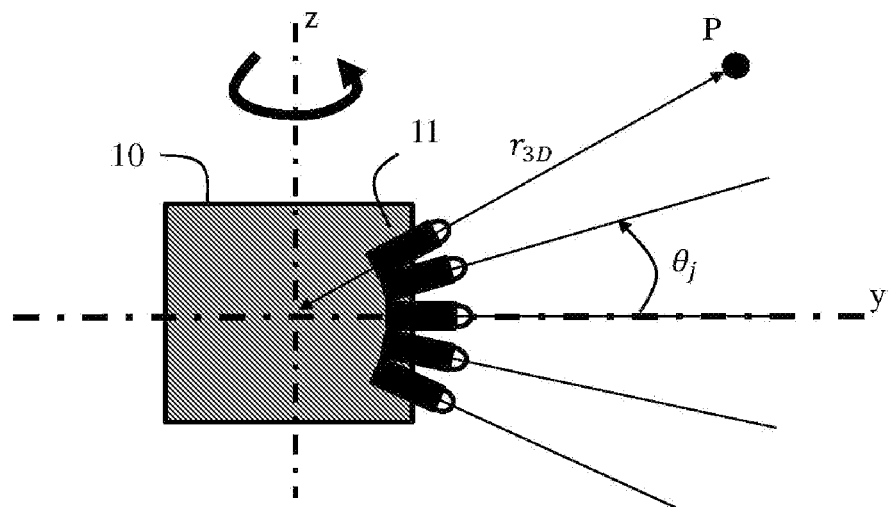
FIG. 1 shows schematically a side view of a sensor head and some of its parameters in accordance with related art.
Figure 2:
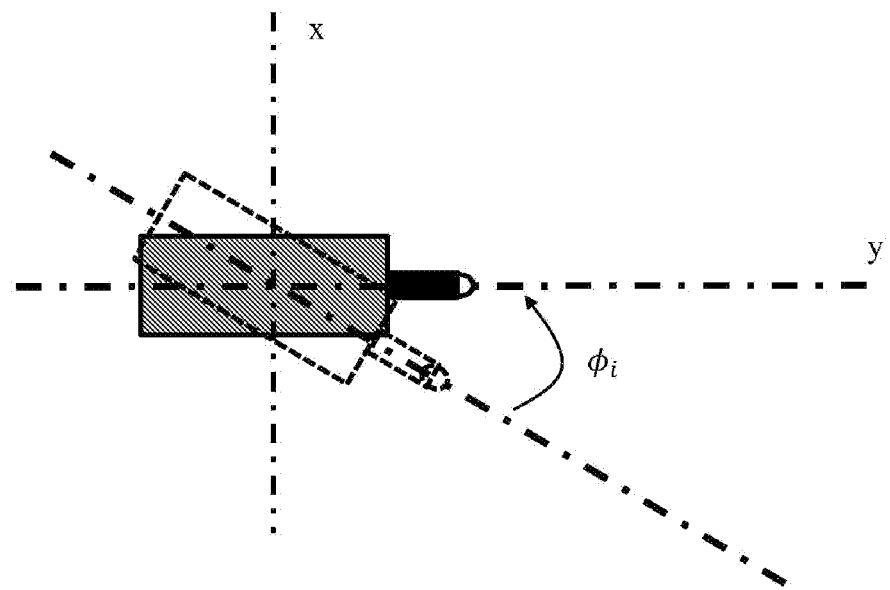
FIG. 2 shows schematically a top view of the sensor head and some of its parameters in accordance with related art.
Figure 3:
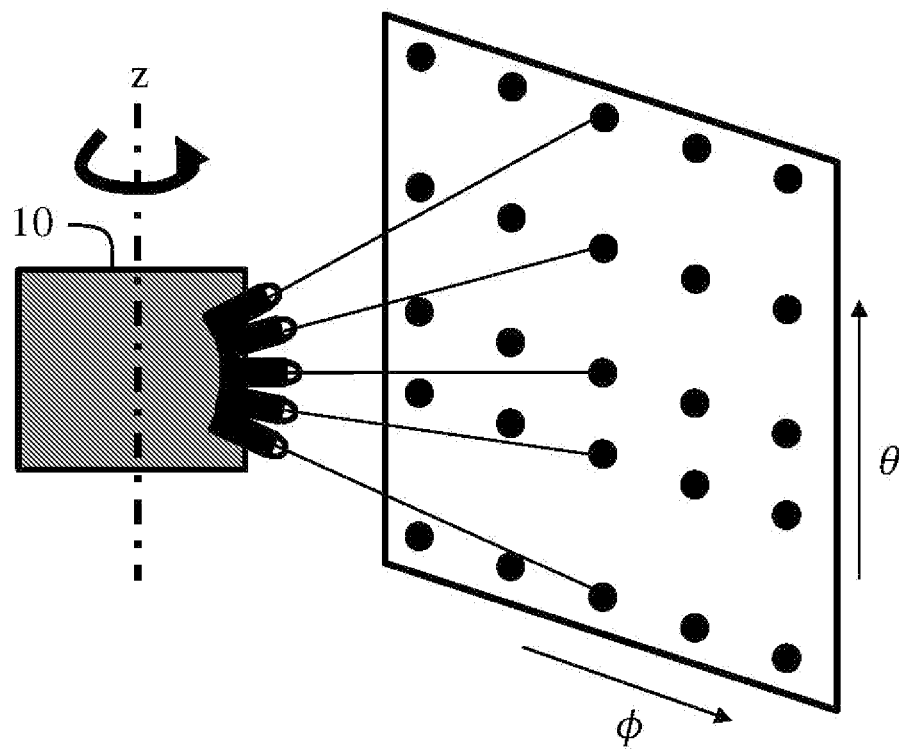
FIG. 3 shows schematically a regular distribution of data sensed by a spinning sensor head in accordance with related art.
Figure 4:
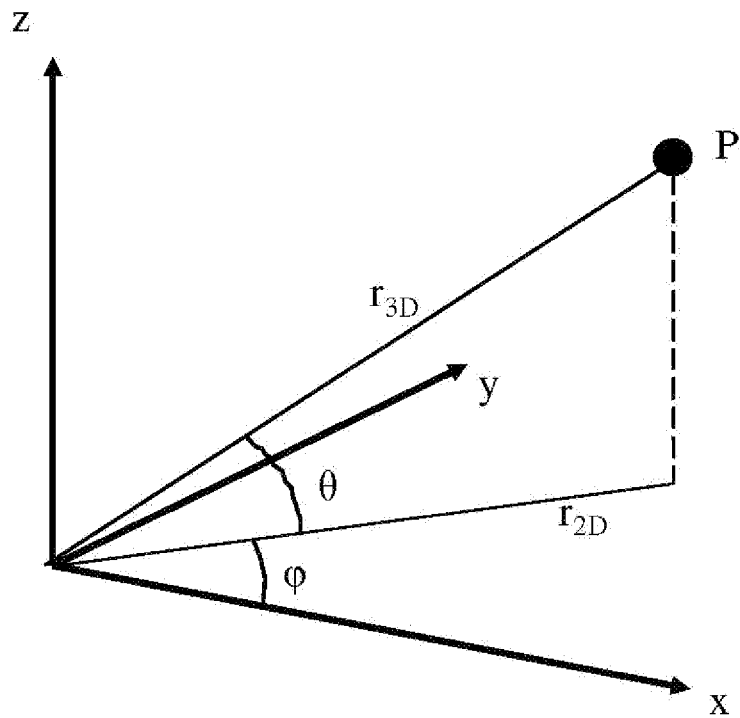
FIG. 4 shows schematically a representation of a point of a point cloud in a 3D space in accordance with related art.
Figure 5:
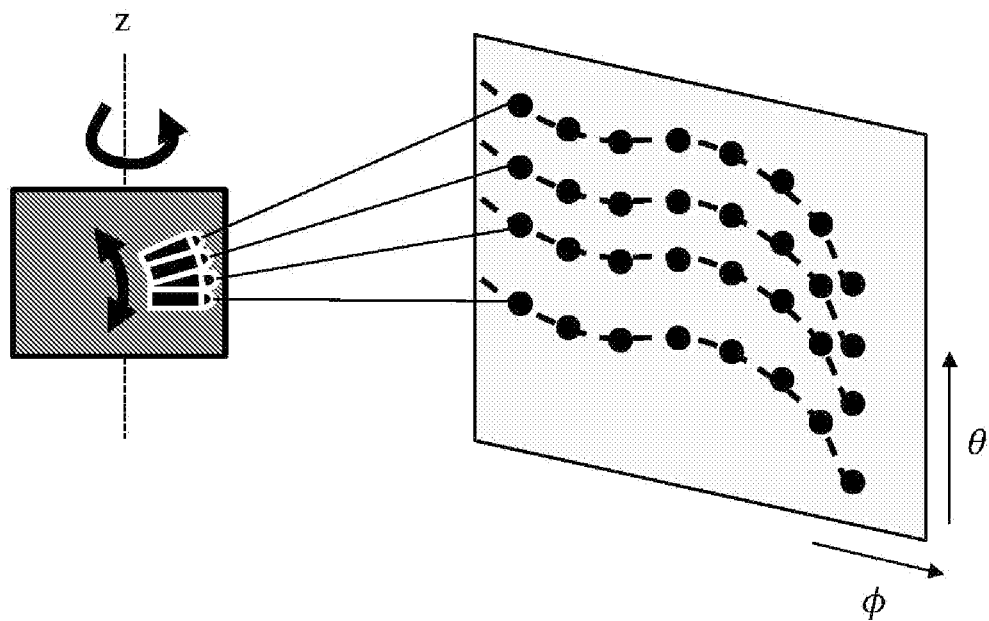
FIG. 5 shows schematically an example of a sensor head able to sense a real scene following a programmable sensing path in accordance with related art.
Figure 6:
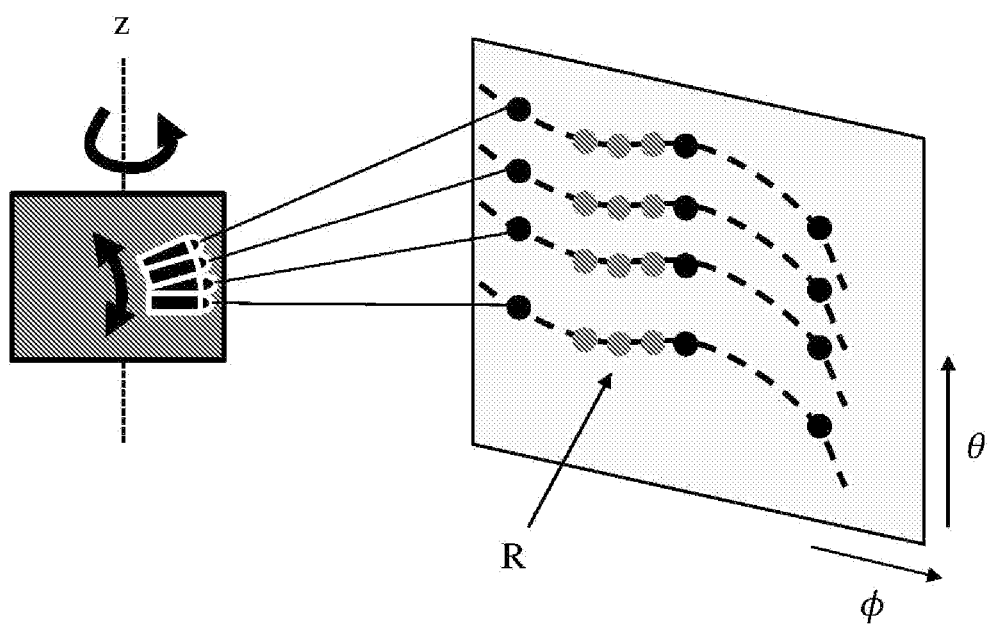
FIG. 6 shows schematically an example of a sensor head able to sense a real scene following a programmable sensing path according to different sensing frequencies in accordance with related art.
Figure 7:
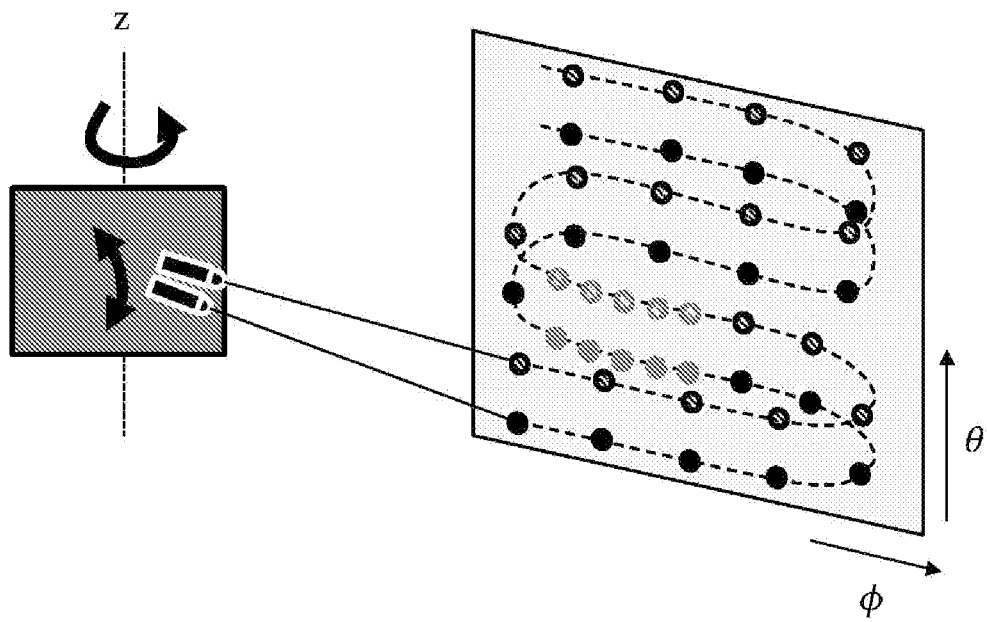
FIG. 7 shows schematically an example of a sensor head able to sense a real scene following a programmable zigzag sensing path according to different sensing frequencies in accordance with related art.
Figure 8:
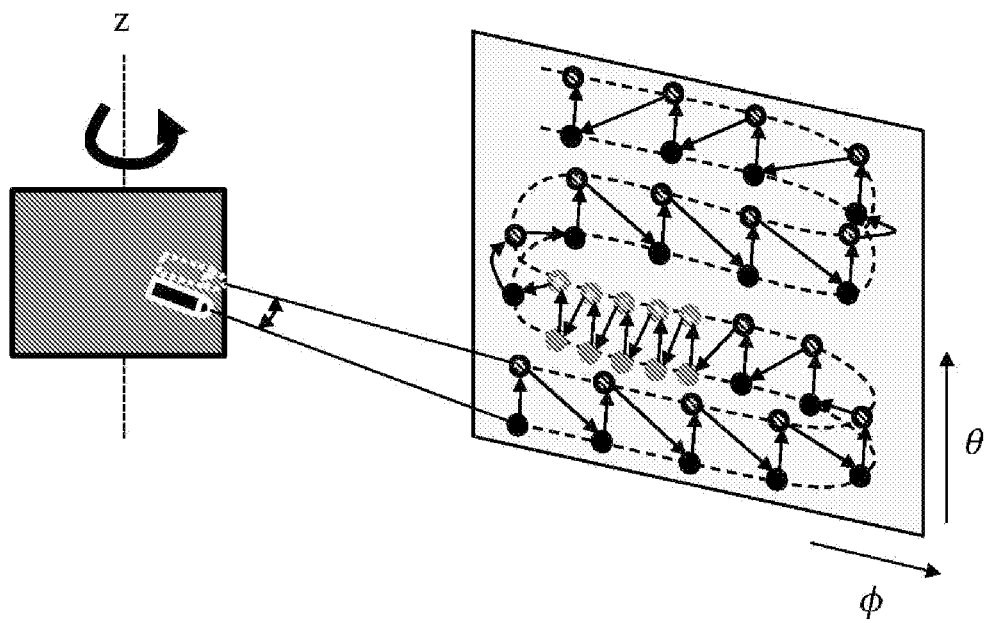
FIG. 8 shows schematically a single sensor head able to sense a real scene following a programmable zigzag sensing path according to different sensing frequencies.

Encoding/decoding point cloud geometry comprises encoding/decoding a radius for each point of the point cloud. The radius associated with a point of the point cloud is the radius $r_{2D}$ equals to a projection of the radius $r_{3D}$ on the xy horizontal plan as depicted on FIG. 4. In the following, a radius represents a projection of a 3D radius associated with a point of the point cloud.

In the following, the disclosure is described by considering a coarse representation defined in the two-dimensional coordinate (s,λ) space. But the same may also be described for a coarse representation defined in the two-dimensional coordinate (ϕ, λ) space because a spinning sensor head, such as a Lidar head, provides a particular coarse representation defined in the two-dimensional coordinate (s,λ) space in which, at each sensing time instant, sensors of the sensor head probe an object and the sensed points correspond to occupied coarse point of the representation.

As discussed above, point cloud geometry data is represented by ordered coarse points occupying some discrete positions of a set of discrete positions of the two-dimensional coordinate (s,λ) space. Each occupied coarse point is then located within the two-dimensional coordinate (s,λ) space by a sensor index associated with a sensor that sensed a point of the point cloud associated with the occupied coarse point, and a sample index associated with a sensing time instant at which the point of the point cloud has been sensed. Each occupied coarse point of the point cloud is considered as being a first occupied coarse point $P_1$ in the methods as discussed below.

A radius associated with a point of the point cloud is also associated with the occupied coarse point that represents the point of the point cloud in the coarse representation.

A radius $r_1$ is associated with a point P of the point cloud represented by a first occupied coarse point $P_1$ in the coarse representation. The first occupied coarse point $P_1$ has a sample index $s_1$ and a sensor index $\lambda_1$ within the two-dimensional coordinate (s,λ). The radius $r_1$ is usually not directly encoded but, instead, a residual radius $r_{res}$ is encoded after being obtained by $$r_{res} = r_1 - r_{pred}$$

where $r_{pred}$ is a predicting radius.

The encoding performance of the radius $r_1$ depends on the quality of the predicting radius $r_{pred}$ that is determined to limit the dynamic range of the residual radius. A smaller dynamic of the residual radius usually requires less bits to be coded into a bitstream.

Usually, a predicting radius $r_{pred}$ is selected from some precedingly encoded radiuses associated with points of the point cloud sensed by a same sensor associated with a sensor index equals to the first sensor index $\lambda_1$. This provides good coding efficiency when the radius $r_1$ does not vary much between two successive sensing time instants (between a sampling index $s_1$ and a sampling index $s_1-1$ for example).

Figure 13:
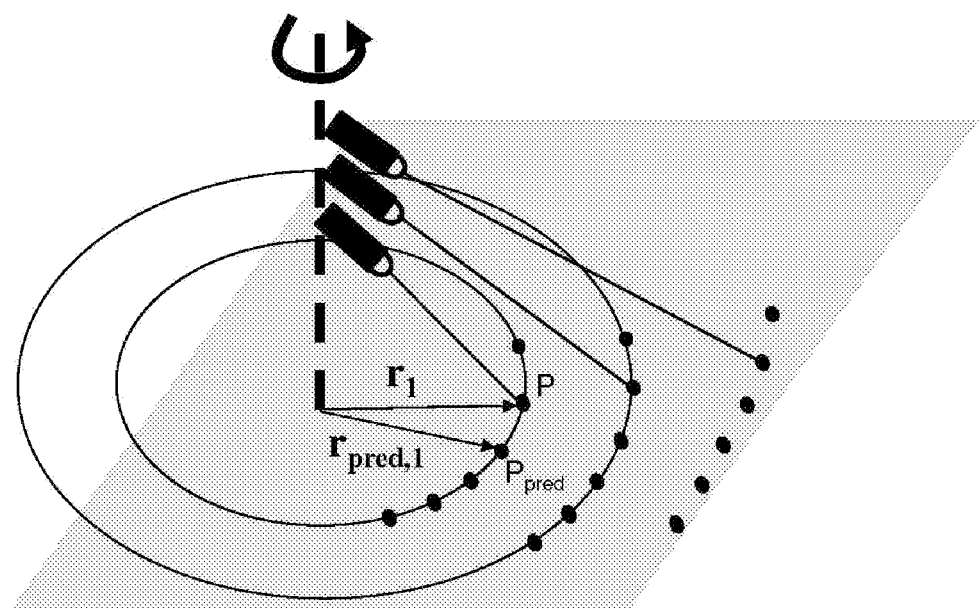
FIG. 13 shows schematically sensors sensing points on a road assimilated to a horizontal plane.

This is particularly true when a spinning sensor probes a road (close to a horizontal plane) as depicted on FIG. 13. In this case, the predicting radius $r_{pred}$ is likely to be equal to the precedingly coded radius $r_{pred,1}$ for the same sensor $\lambda_1$.

Figure 14:
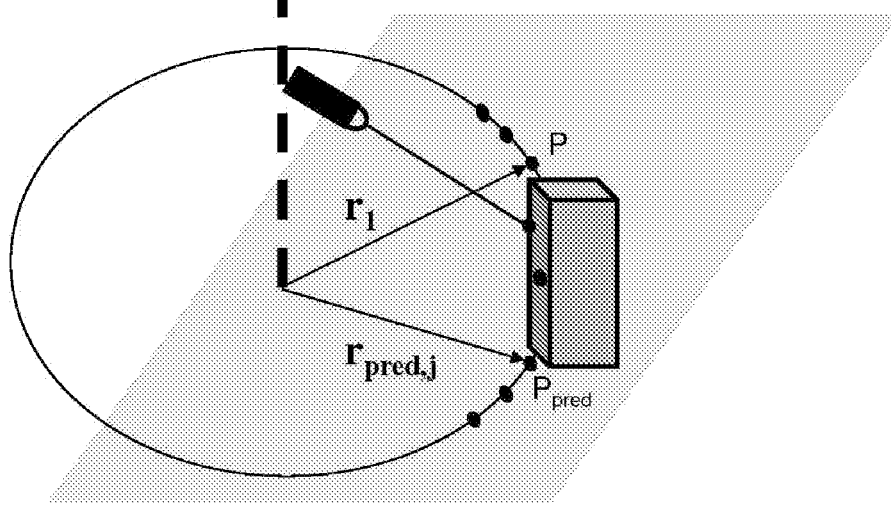
FIG. 14 shows schematically sensors sensing points on a road with an object.

Of course, some objects may be placed on the road as depicted in FIG. 14. In this case, the predicting radius $r_{pred}$ may not be the precedingly encoded radius $r_{pred,1}$ but another precedingly encoded radius $r_{pred,j}$ further in the past (j>1).

For this reason, the predicting radius $r_{pred}$ is usually selected from a list of radiuses corresponding to precedingly encoded/decoded radiuses associated with points of the point cloud sensed by the same sensor $\lambda_1$. Such a list of radiuses cannot provide a good predicting radius $r_{pred}$ when a new object is sensed for the first time, i.e. no precedingly encoded/decoded radiuses associated with points of the new objects belong to the list of radiuses.

Figure 15:
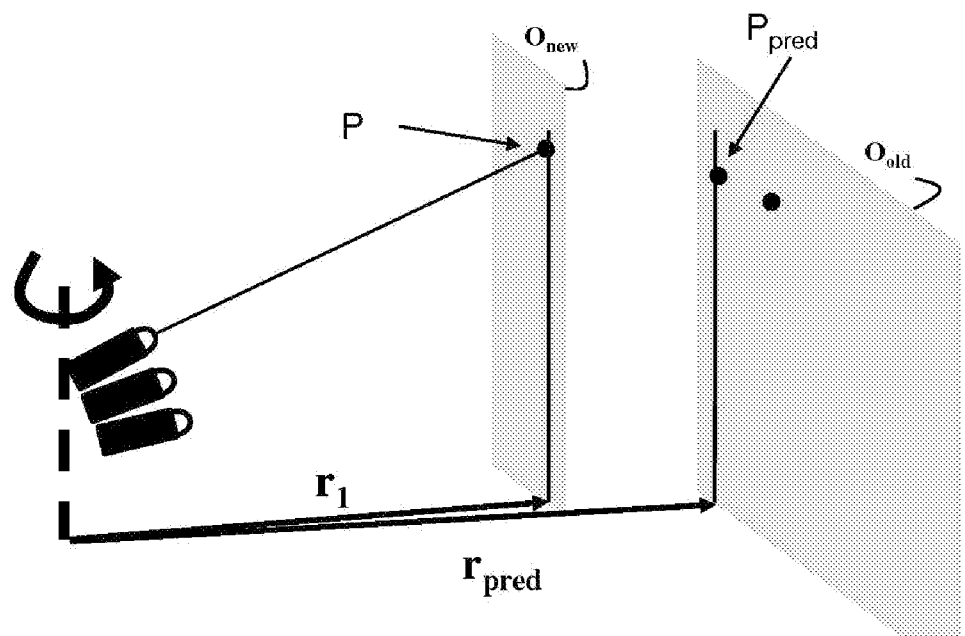
FIG. 15 shows schematically a predicting radius when a radial jump occurs from an old object to a new object in accordance with related art.

This case is depicted on FIG. 15 where a point P belonging to a new object $O_{new}$ is predicted by a predicting point $P_{pred}$ belonging to another object $O_{old}$ because the point P is the first point of the new object $O_{new}$ sensed by the sensor $\lambda_1$. Consequently, the predicting radius $r_{pred}$ is far from the first radius $r_1$ associated with the point P and the dynamic of the residual radius $r_{res}$ is big. Coding such a residual radius is costly in terms of bitrate.

One of the problem to solve is to better handle the transition from an old object to a new object that leads to a radius jump (for a same sensor $\lambda_1$) and bad radius prediction. By improving the prediction, better performance compression should be obtained as it would reduce the dynamic of the residual radius $r_{res}$ to be encoded.

In brief, the present disclosure provides a solution to this problem by selecting the predicting radius $r_{pred}$ associated with a point P of the point cloud to be encoded and represented by a first occupied coarse point $P_1$ having a first sensor index $\lambda_1$ and a first sample index within the two-dimensional coordinate (s,λ) space, from at least one second radius associated with at least one point sensed by sensors associated with sensor indices different from the first sensor index $\lambda_1$, and sample indices lower than or equal to the first sample index $s_1$. The at least one second point of the point cloud are represented by at least one second occupied coarse point in the coarse representation.

Selecting a predicting radius of a sensed point belonging to a new object from radiuses associated with points sensed by sensors associated with a sensor index different from the first sensor index, provides a better prediction than a prediction obtained from radiuses associated with points sensed by a sensor associated with a sensor index is equal to the first sensor index.

Figure 16:
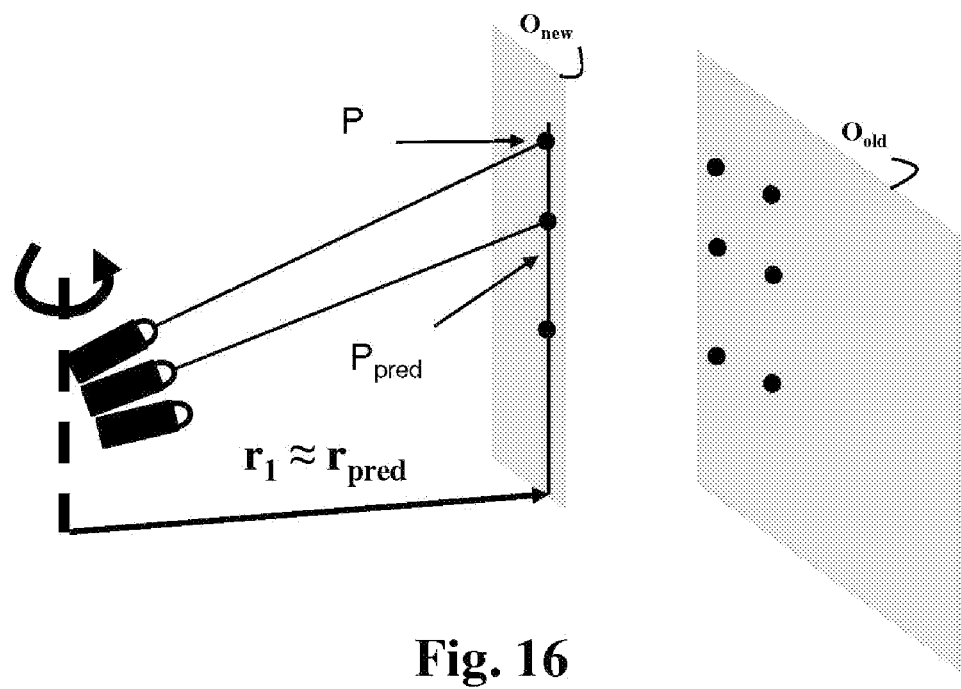
FIG. 16 shows schematically a predicting radius from another sensor when a radial jump occurs from an old object to a new object in accordance with at least one embodiment.

For example, on FIG. 16 is depicted an example of a selected predicting radius associated with a predicting point $P_{pred}$ sensed by a sensor associated with a sensor index different from the first sensor index $\lambda_1$. The residual radius between the radiuses associated with the points P and $P_{pred}$ has a lower dynamic than the residual radius between the radiuses associated with the points P and $P_{pred}$ as depicted on FIG. 15.

Coding residual radiuses is thus improved compared to coding residual radiuses obtained from predicting radiuses corresponding to precedingly encoded/decoded radiuses associated with points sensed by a same sensor.

The predicting radiuses are associated with points sensed by sensors having a sensor index different from the first sensor index $\lambda_1$ and those points are also associated with sample indices lower than or equal to the first sample index $s_1$, i.e. points that belong to a causal neighborhood of the point P.

This allows both an encoder and a decoder to obtain the same predicting radius.

Figure 17:
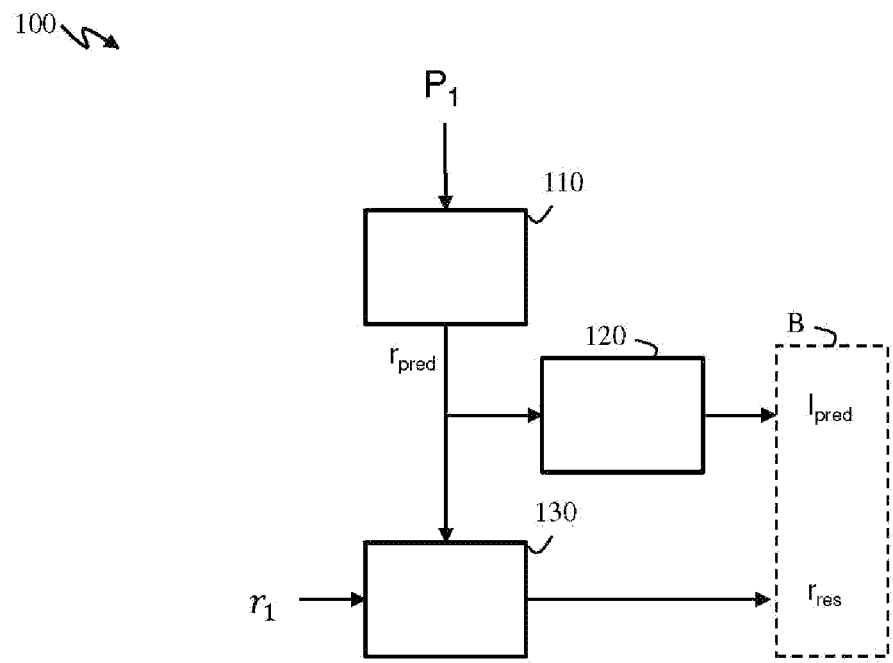
FIG. 17 shows a schematic block diagram of steps of a method 100 of encoding point cloud geometry data into a bitstream of encoded point cloud data in accordance with at least one embodiment.

FIG. 17 shows a schematic block diagram of steps of a method 100 of encoding point cloud geometry data into a bitstream of encoded point cloud data in accordance with at least one embodiment.

A first occupied coarse point $P_1$ is considered within the two-dimensional coordinate $(s,\lambda)$ space. The first occupied coarse point $P_1$ represents a sensed point of the point cloud in the coarse representation. The first occupied coarse point $P_1$ has a first sample index $s_1$ and a first sensor index $\lambda_1$ in the two-dimensional coordinate $(s, \lambda)$ space and is associated with a first radius $r_1$.

In step 110, a selected predicting radius $r_{pred}$ is obtained, for the first occupied coarse point $P_1$, from at least one second radius $r_2$ associated with at least one second occupied coarse point $P_2$. Each second occupied coarse point $P_2$ has a second sensor index $\lambda_2$ different from the first sensor index $\lambda_1$ and a second sample index $s_2$ lower than or equal to the first sample index $s_1$.

Figure 19:
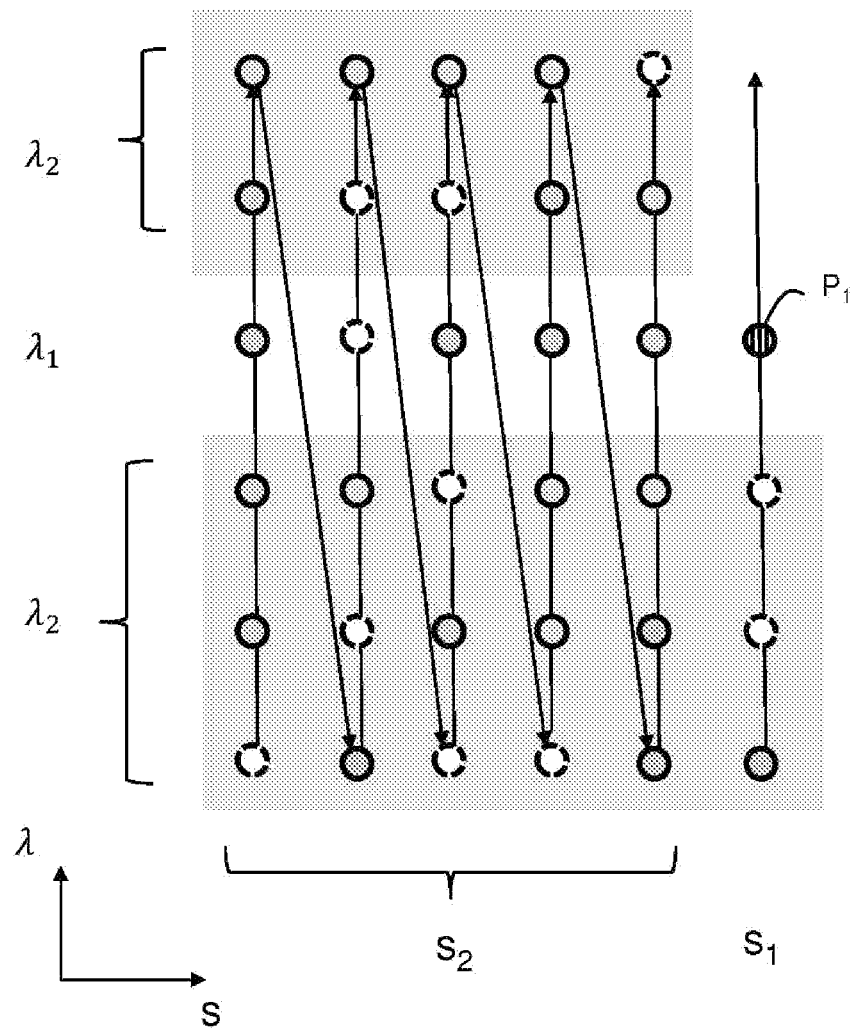
FIG. 19 shows schematically an example of coarse points belonging to a neighborhood of a first occupied coarse point in accordance with one embodiment.

FIG. 19 shows schematically an example of coarse points belonging to a causal neighborhood of the first occupied coarse point $P_1$. Unoccupied coarse points are white points delimited by dotted lines, and grey points represent occupied coarse points.

Grey shaded areas represent groups of second coarse points having a second sensor index $\lambda_2$ different from the first sensor index $\lambda_1$ and a second sample index $s_2$ lower than or equal to the first sample index $s_1$. The arrows between coarse points indicate the ordering of the coarse point in the coarse representation. Some of second coarse points are occupied (grey points) and other an unoccupied (white points). All the grey shaded areas form the causal neighborhood surrounding the first occupied coarse points, i.e. the occupied second coarse points that belong to this causal neighborhood may be obtained and/or decoded, by the encoding and/or decoding method, before processing the first occupied coarse point $P_1$. Note that, the coarse points having a sensor index is equal to the first sensor index $\lambda 1$ are not second coarse points and do not belong to a grey shaded area.

In step 120, a data $I_{pred}$ is encoded into a bitstream B. The data $I_{pred}$ is representative of the selected predicting radius $r_{pred}$.

In step 130, a residual radius $r_{res}$ is obtained by calculating a difference between the first radius $r_1$ and the selected predicting radius $r_{pred}$:

$$r_{res} = r_1 - r_{pred}$$

The residual radius $r_{res}$ is encoded into the bitstream B.

In one embodiment of step 110, when the selected predicted radius $I_{pred}$ is selected among radiuses $r_2$ associated with multiple second occupied coarse points $P_2$, the selected predicted radius $r_{pred}$ correspond to the radius that minimizes a cost function representative of a bitrate (for encoding a residual radius $r_{res}$) or a tradeoff between a targeted bitrate and a distortion.

In one embodiment of step 130, the residual radius $r_{res}$ may be coded by a binary data signaling if the residual radius $r_{res}$ is equal to zero, then a binary data signaling the sign of the residual radius $r_{res}$, and the remainder $|r_{res}|-1$ may be coded by using an expGolomb coder.

In one variant, the remainder $|Q(r_{res})|-1$ may be coded by using an expGolomb coder where $Q(r_{res})$ is a quantized residual radius.

Any other encoding of the residual radius $r_{res}$ may be used without limiting the scope of the present disclosure.

Figure 18:
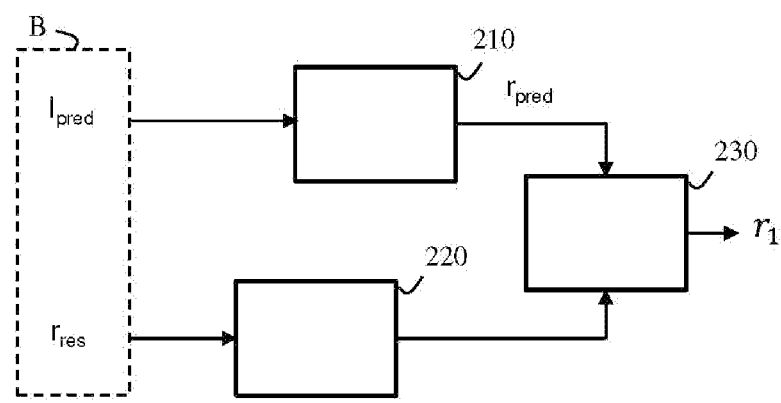
FIG. 18 shows a schematic block diagram of steps of a method 200 of decoding point cloud geometry data from a bitstream of encoded point cloud data in accordance with at least one embodiment.

FIG. 18 shows a schematic block diagram of steps of a method 200 of decoding point cloud geometry data from a bitstream of encoded point cloud data in accordance with at least one embodiment.

The decoding method 200 of FIG. 18 corresponds to the encoding method 100 of FIG. 17.

A first occupied coarse point $P_1$ within the two-dimensional coordinate $(s,\lambda)$ space is considered. The first occupied coarse point $P_1$ has a first sample index $s_1$ and a first sensor index $\lambda_1$ in the two-dimensional coordinate $(s, \lambda)$ space.

In step 210, a data $I_{pred}$ is decoded from the bitstream B. The data $I_{pred}$ is representative of a selected predicting radius $r_{pred}$ selected from at least one second radius $r_2$ associated with at least one second occupied coarse point $P_2$ having a second sensor index $\lambda_2$ different from the first sensor index $\lambda_1$ and a second sample index $s_2$ lower than the first sample index $s_1$.

In step 220, a residual radius $r_{res}$ is decoded from the bitstream B.

In step 230, a (decoded) radius $r_1$, associated with a point of the point cloud represented by the first coarse point $P_1$, is obtained based on the residual radius $r_{res}$ and a selected predicting radius $r_{pred}$ obtained from the data $I_{pred}$:

$$r_1 = r_{res} + r_{pred}$$

In one embodiment of step 230, the residual radius $r_{res}$ may be decoded by decoding a binary data signaling if the residual radius $r_{res}$ is equal to zero, and, possibly, by decoding a binary data signaling the sign of the residual radius $r_{res}$, and, possibly, by decoding a remainder $|r_{res}|-1$ by using an expGolomb decoder.

In one variant, the remainder $|Q(r_{res})|-1$ may be decoded by using an expGolomb decoder and the residual radius $r_{res}$ is obtained by:

$$r_1 = IQ(Q(r_{res})) + r_{pred}$$

where $IQ(Q(r_{res}))$ is a dequantized residual radius.

Any other decoding of the residual radius $r_{res}$ may be used without limiting the scope of the present disclosure.

Figure 20:
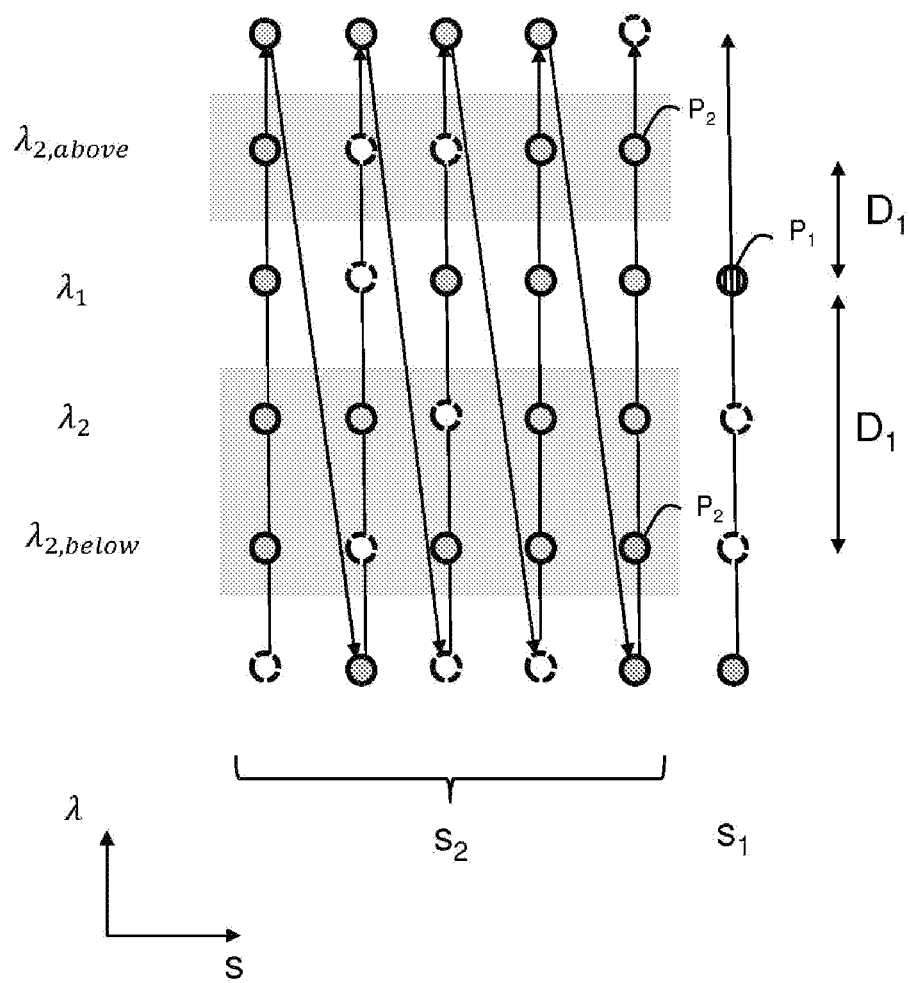
FIG. 20 shows schematically an example of coarse points belonging to a neighborhood of a first occupied coarse point in accordance with one embodiment of the methods 100 and 200.

In one embodiment of the methods 100 and 200, illustrated on FIG. 20, the selected predicting radius $r_{pred}$ may be equal to a second radius $r_2$ associated with a second occupied coarse point $P_2$ such as a first distance $D_1$ between the second sensor index $\lambda_2$ of the second occupied coarse point $P_2$ and the first sensor index $\lambda_1$ is bounded by two bounds $\lambda_{2;below}$ and $\lambda_{2;above}$. The bound $\lambda_{2;below}$ equals 2 and the bound $\lambda_{2;above}$ equals 1 on the illustrative example of FIG. 20.

Bounding the first distance $D_1$ limits the causal neighborhood of the first occupied coarse point $P_1$ and thus limits the computing resources for selecting a predicting radius. It also secures some correlation between radiuses $r_1$ and $r_2$ because this correlation tends to disappear when the sensor index difference $|\lambda_2-\lambda_1|$ is large.

According to this embodiment of the methods 100 and 200, a second occupied coarse point $P_2$ may be an occupied coarse point having a second sensor index $\lambda_2$ different from the first sensor index $\lambda_1$ and a second sample index $s_2$ lower than or equal to the first sample index $s_1$. The second occupied coarse point $P_2$ also fulfills the condition that the first distance between the second sensor index $\lambda_2$ of the second occupied coarse point $P_2$ and the first sensor index $\lambda_1$ is in a range defined by the two bounds $\lambda_{2;below}$ and $\lambda_{2;above}$. Such second occupied coarse points belong to the grey shaded parts on FIG. 20.

Figure 21:
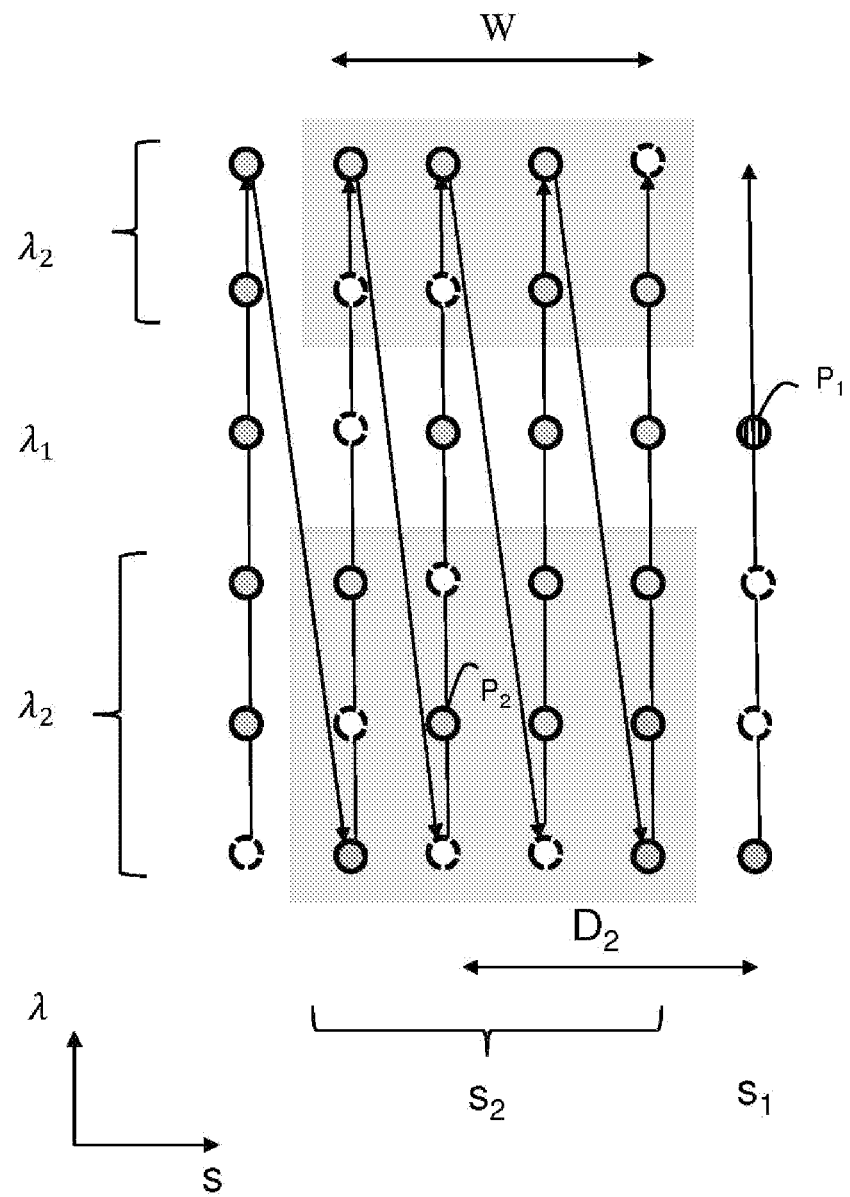
FIG. 21 shows schematically an example of coarse points belonging to a neighborhood of a first occupied coarse point in accordance with one embodiment of the methods 100 and 200.

In one embodiment of the methods 100 and 200, illustrated on FIG. 21, the selected predicting radius $r_{pred}$ may be equal to a second radius $r_2$ associated with a second occupied coarse point $P_2$ such as a second distance $D_2$ between a second sample index $s_2$ of the second occupied coarse point $P_2$ and the first sample index $s_1$ is bounded by a bound W. On FIG. 21, such second occupied coarse points $P_2$ belong to the grey shaded parts and the bound W equals 4.

Bounding the second distance $D_2$ limits the causal neighborhood of the first coarse point $P_1$ and thus limits the computing resources for selecting a predicting radius. It also secures some correlation between radiuses $r_1$ and $r_2$ because this correlation tends to disappear when the sensor index difference $s_1-s_2$ is large because points $P_1$ and $P_2$ tend to belong to different objects or different parts of a same object.

According to this embodiment of the methods 100 and 200, a second occupied coarse point $P_2$ may be an occupied coarse point having a second sensor index λ2 different from the first sensor index 11 and a second sample index $s_2$ lower than or equal to the first sample index $s_1$. The second occupied coarse point $P_2$ also fulfills the condition that the second distance $D_2$ between the second sample index $s_2$ of the second occupied coarse point $P_2$ and the first sample index $s_1$ is bounded by the bound W.

Figure 22:
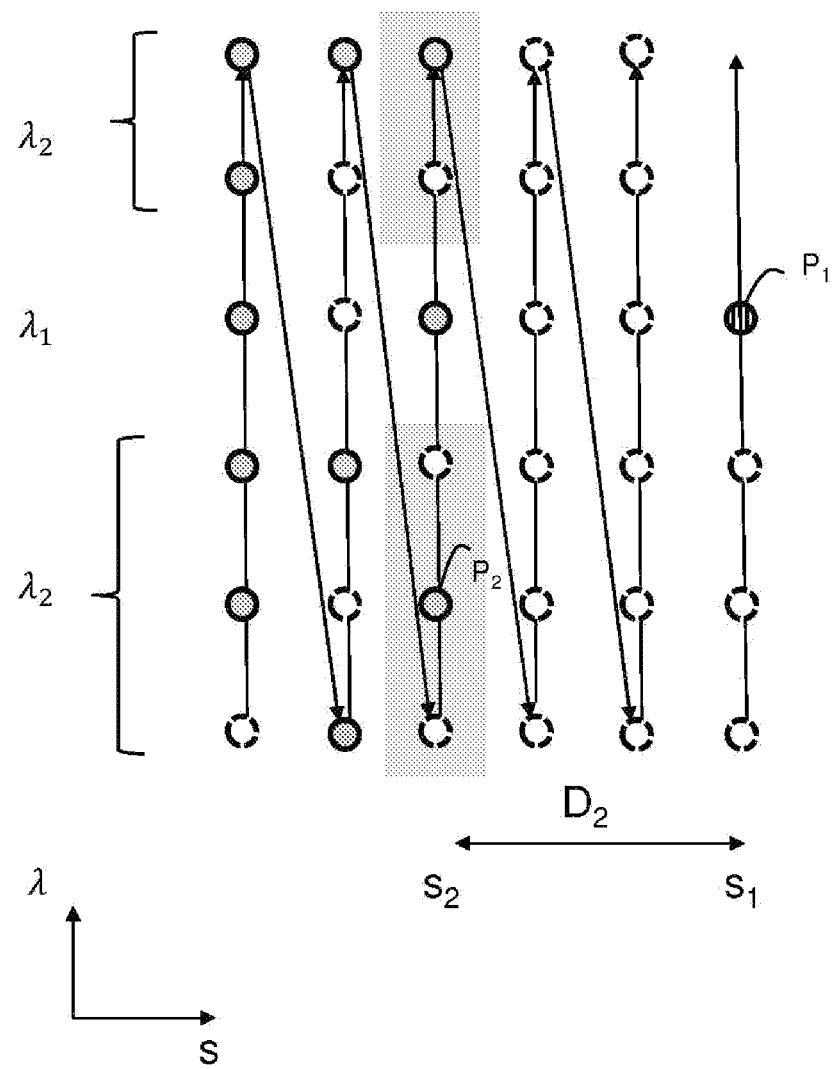
FIG. 22 shows schematically an example of coarse points belonging to a neighborhood of a first occupied coarse point in accordance with one embodiment of the methods 100 and 200.

In one variant, illustrated on FIG. 22, the selected predicting radius $r_{pred}$ may be equal to a second radius $r_2$ associated with a second occupied coarse point $P_2$ such as the second distance $D_2$ is minimum.

This variant maximizes the chance of having a good predicting radius because the second occupied coarse points $P_2$ considered for the selection of a predicting radius are the closest occupied coarse points from the first coarse point $P_1$. Thus, the first occupied coarse point $P_1$ and the second occupied coarse points $P_2$ may be very likely associated with points of a same sensed object.

According to this variant, a second occupied coarse point $P_2$ is an occupied coarse point having a second sensor index $\lambda_2$ different from the first sensor index $\lambda_1$ and a second sample index $s_2$ lower than or equal to the first sample index $s_1$. The second occupied coarse point $P_2$ also fulfills the condition that the second distance $D_2$ is minimum. On FIG. 22, such second occupied coarse points belong to the grey shaded parts and two occupied second coarse points $P_2$ are considered for selecting the predicting radius $r_{pred}$.

Figure 23:
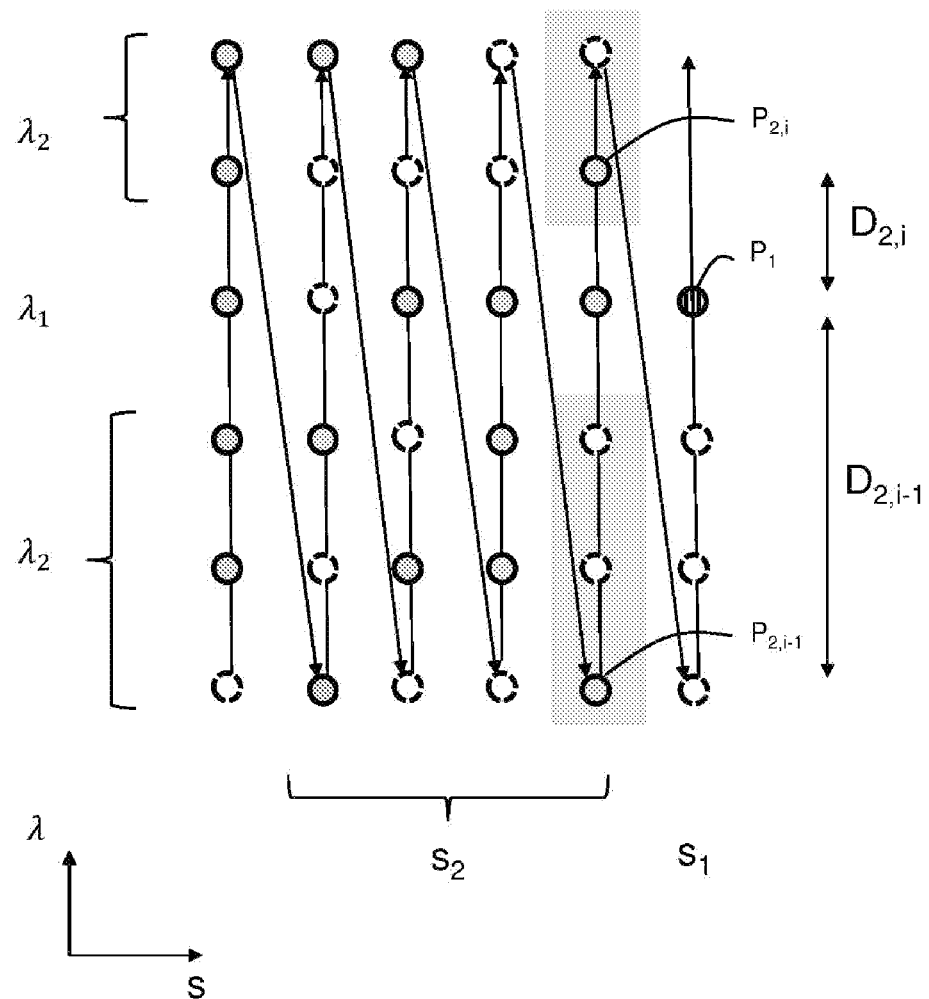
FIG. 23 shows schematically an example of coarse points belonging to a neighborhood of a first occupied coarse point in accordance with one embodiment of the methods 100 and 200.

In one embodiment of the methods 100 and 200, illustrated on FIG. 23, the selected predicting radius $r_{pred}$ may be selected based on at least two second radiuses $r_{2,i}$ associated with at least two second occupied coarse points $P_{2,i}$ having a same second distance $D_2$ between their second sample index $s_2$ and the first sample index $s_1$. The selected predicting radius $r_{pred}$ is equal to a second radius $r_{2,i}$ associated with a second occupied coarse point $P_{2,i}$ either having a closest sensor index $\lambda_{2,i}$ relative to the first sensor index $\lambda_1$ (point $P_{2,i}$ on FIG. 23) or, in one variant, having a closest sensor index below (lower than) the first sensor index $\lambda_1$ (point $P_{2,i-1}$ on FIG. 23).

According to this embodiment of the methods 100 and 200, a second occupied coarse point $P_2$ may be an occupied coarse point having a second sensor index $\lambda_2$ different from the first sensor index $\lambda_1$ and a second sample index $s_2$ lower than or equal to the first sample index $s_1$. The second occupied coarse point P2 has a closest sensor index $\lambda_{2,i}$ relative to the first sensor index $\lambda_1$ or, in one variant, has a closest sensor index below (lower than) the first sensor index $\lambda_1$.

This embodiment and its variant maximize the chance of having a good predicting radius because the second occupied coarse points $P_2$ considered for the selection of a predicting radius are the closest occupied coarse points from the first coarse point $P_1$ within the two-dimensional coordinate $(s,\lambda)$ space. Thus, the first occupied coarse point $P_1$ and the second occupied coarse points $P_2$ may be very likely associated with points of a same sensed object.

In one variant, the selected predicting radius $I_{pred}$ may be equal to an average of the at least two second radiuses $r_{2,i}$.

Figure 24:
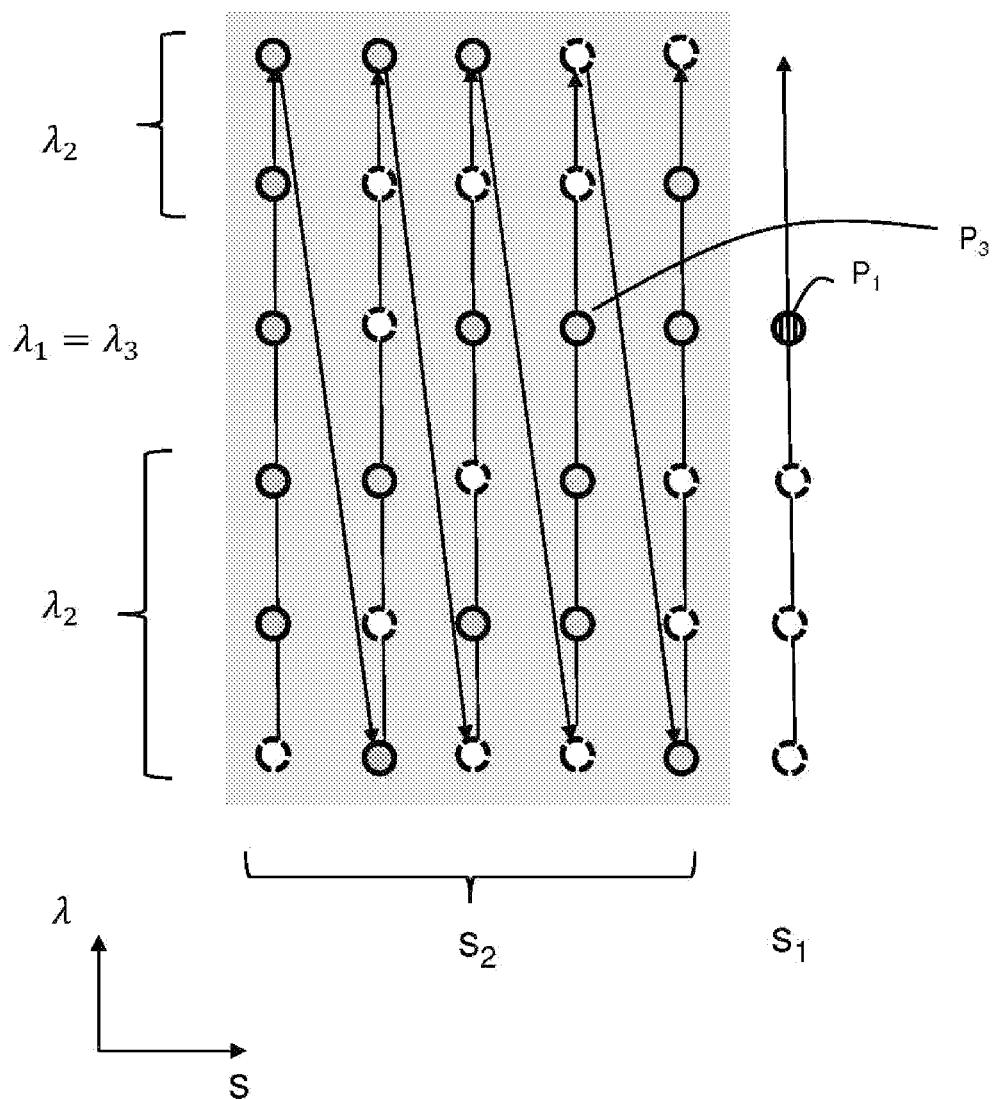
FIG. 24 shows schematically an example of coarse points belonging to a neighborhood of a first occupied coarse point in accordance with one embodiment of the methods 100 and 200.

In one embodiment of the method of the methods 100 and 200, illustrated on FIG. 24, the selected predicting radius $r_{pred}$ may be selected from at least one second radius $r_2$ associated with at least one second occupied coarse point $P_2$, and at least one third radius $r_3$ associated with at least one third occupied coarse point $P_3$ having a sensor index $\lambda_3$ equal to the first sensor index $\lambda_1$ and a sample index $s_3$ lower than the first sample index $s_1$.

This embodiment is advantageous because it provides good predicting radiuses in both cases where new sensed points belong to a new object or where new sensed points belong to an object precedingly sensed.

In one embodiment of the methods 100 and 200, the method may further comprise correcting the selected predicting radius $r_{pred}$, obtained from at least one second radius $r_2$ (or $r_{2,i}$) associated with at least one second occupied coarse point $P_2$ (or $P_{2,i}$) having at least one second sample index $s_2$ (or $s_{2,i}$), by a first correction value C1 based on the at least one second sample index $s_2$ (or $s_{2,i}$) and the first sample index $s_1$.

This embodiment is advantageous because it corrects the discrepancy in the sample indices that may occur when the second sample index of a second occupied coarse point is strictly lower than the first sample index:

$$r_{pred,corr} = r_{pred} + C1$$

In one embodiment of the methods 100 and 200, the correction value C1 may depend on a derivative estimated from two occupied coarse points $P_{O1}$ and $P_{O2}$ having different sample indices respectively $s_{O1}$ and $s_{O2}$, same sensor index (that may or may not be equal to the first sensor index $\lambda_1$) and associated radiuses $r_{O1}$ and $r_{O2}$ by:

$$C1 = (s_1 - s_2) * \frac{d_r}{d_s}$$

where $$\frac{d_r}{d_s} = \frac{r_{O1} - r_{O2}}{s_{O1} - s_{O2}}$$

In one embodiment of the methods 100 and 200, the derivative may be estimated from a set of occupied coarse points $P_{O,i}$ having sensing indices $s_{O,i}$, radiuses $r_{O,i}$ and same sensor index. A regression line of equation r=a*s+b is obtained from these occupied coarse points $P_{O,i}$, for example by a Least Mean Square method. The derivative is then taken as dr/ds≈a.

In one embodiment of the methods 100 and 200, the method may further comprise correcting the selected predicting radius $r_{pred}$, obtained from at least one second radius $r_2$ (or $r_{2,i}$) associated with at least one second occupied coarse point $P_2$ (or $P_{2,i}$) having at least one second sensor index $\lambda_2$ (or $\lambda_{2,1}$) by a second correction value C2 based on the at least one sensor index $\lambda_2$ (or $\lambda_{2,i}$) and the first sensor index $\lambda_1$.

This embodiment is advantageous because it correct the discrepancy in the sensor indices that may occur when the second sensor index of a second occupied coarse point is different from the first sensor index:

$$r_{pred,corr} = r_{pred} + C2$$

In one embodiment of the methods 100 and 200, the correction value C2 may depend on a derivative estimated from two occupied coarse points $P_{O1}$ and $P_{O2}$ having different sensor indices respectively $\lambda_{O1}$ and $\lambda_{O2}$, same sample index (that may or may not be equal to the first sample index $s_1$) and associated radiuses $r_{O1}$ and $r_{O2}$ by:

$$C2 = (\lambda_1 - \lambda_2) * \frac{d_r}{d_\lambda}$$

where $$\frac{d_r}{d_\lambda} = \frac{r_{O1} - r_{O2}}{\lambda_{O1} - \lambda_{O2}}$$

In one embodiment of the methods 100 and 200, the derivative may be estimated from a set of occupied coarse points $P_{O,i}$ having sensor indices $\lambda_{O,i}$, radiuses $r_{O,i}$ and same sampling index. A regression line of equation r=c*λ+d is obtained from these occupied coarse points $P_{O,i}$, for example by a Least Mean Square method. The derivative is then taken as dr/ds≈c.

In one embodiment of the methods 100 and 200, the selected predicting radius $r_{pred}$ may be obtained as a response of a radial function to the first sensor index $s_1$ and the first sensor index $\lambda_1$, and wherein the radial function is obtained by a linear regression of the second radiuses $r_{2,i}$ associated with at least two other second occupied coarse points ($P_{2,i}$), based on second sample indices $s_{2,i}$ and second sensor indices $\lambda_{2,i}$ of the at least two second occupied coarse points $P_{2,i}$.

For example, a linear function of equation r=e*λ+f*s+g is obtained from the second occupied coarse points $P_{2,i}$, for example by a Least Mean Square method. The predicting radius $r_{pred}$ is then obtained by $$r_{pred} = e * \lambda_1 + f * s_1 + g$$

Figure 25:
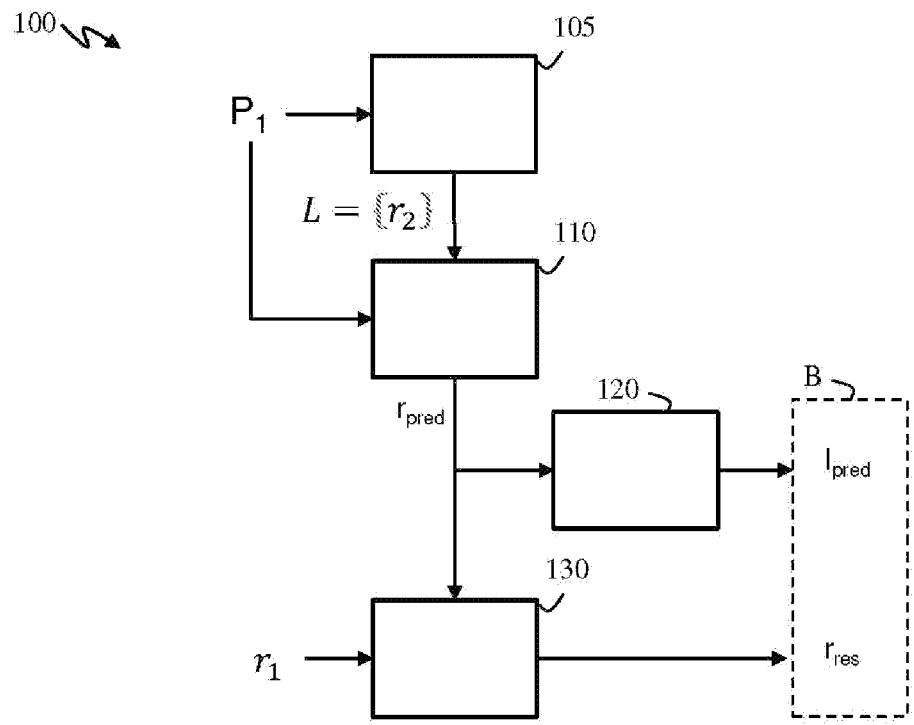
FIG. 25 shows a schematic block diagram of steps of a variant of the method 100 of FIG. 17.

FIG. 25 shows a schematic block diagram of steps of a variant of the method 100 of FIG. 17.

In step 105, a list of candidate radiuses L={$r_2$} is obtained for the first occupied coarse point $P_1$. The list of candidate radiuses L comprises at least one second radius $r_2$ associated with at least one second occupied coarse point $P_2$ having a second sensor index $\lambda_2$ different from the first sensor index $\lambda_1$ and having a second sample index $s_2$ lower than or equal to the first sample index $s_1$.

The at least one second occupied coarse points may also be obtained according to any embodiment or variant discussed in relation with FIG. 17 or any of their combinations.

According to FIG. 25, the at least one second occupied coarse point $P_2$ further fulfills at least one eligibility condition indicating that the radius associated with the at least one second occupied coarse point $P_2$ is likely reducing a dynamic of the residual radius $r_{res}$.

In one embodiment of the variant of the method 100, a radius associated with an occupied coarse point that is selected according to at least one embodiment or variant discussed in relation with FIG. 17 or any of their combination, does not participate to the selection of a predicting radius $r_{pred}$ if the at least one occupied coarse point does not fulfill the at least one eligibility condition. The eligibility conditions is a screening of the occupied coarse points that may be selected according to at least one embodiment or variant discussed in relation with FIG. 17 or any of their combination.

In step 110, a selected predicting radius $r_{pred}$ is obtained for the first occupied coarse point $P_1$ from the list of candidate radiuses L.

In step 120, a data $I_{pred}$ is encoded into a bitstream B. The data $I_{pred}$ is representative of the selected predicting radius $r_{pred}$ in the list of candidate radiuses L.

In step 130, the residual radius $r_{res}$ is obtained and encoded into the bitstream B.

In one embodiment of step 110, when the selected predicted radius $r_{pred}$ is selected among multiple radiuses associated with multiple second and/or multiple third occupied coarse points, the selected predicted radius $r_{pred}$ correspond to the radius that minimizes a cost function representative of a bitrate (for encoding a residual radius $r_{res}$) or a tradeoff between a targeted bitrate and a distortion.

Figure 26:
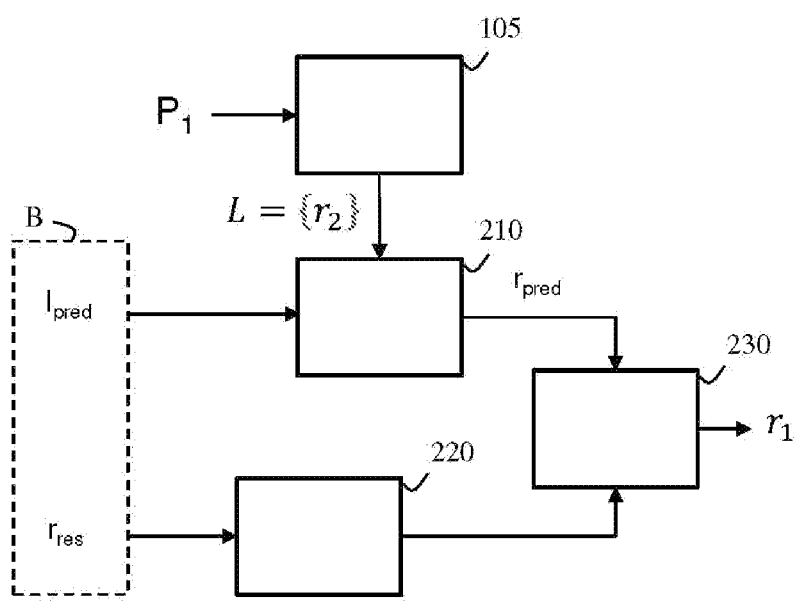
FIG. 26 shows a schematic block diagram of steps of a variant of the method 200 of FIG. 18.

FIG. 26 shows a schematic block diagram of steps of a variant of the method 200 of FIG. 18.

A first occupied coarse point $P_1$ within the two-dimensional coordinate (s,λ) space is considered. The first occupied coarse point $P_1$ has a first sample index $s_1$ and a first sensor index $\lambda_1$ in the two-dimensional coordinate (s, λ) space.

In step 105, a list of candidate radiuses L={$r_2$} is obtained for the first occupied coarse point $P_1$. The list of candidate radiuses L comprises at least one second radius $r_2$ associated with at least one second occupied coarse point $P_2$ having a second sensor index $\lambda_2$ different from the first sensor index $\lambda_1$ and having a second sample index $s_2$ lower than or equal to the first sample index $s_1$.

The at least one second occupied coarse points may also be obtained according to any embodiment or variant discussed in relation with FIG. 18 or any of their combination.

According to FIG. 26, the at least one second occupied coarse point $P_2$ further fulfills at least one eligibility condition indicating that the radius associated with the at least one second occupied coarse point $P_2$ is likely reducing a dynamic of the residual radius $r_{res}$.

In one embodiment of the variant of the method 200, a radius associated with an occupied coarse point that is selected according to at least one embodiment or variant discussed in relation with FIG. 18 or any of their combination, does not participate to the selection of a predicting radius $r_{pred}$ if the at least one occupied coarse point does not fulfill the at least one eligibility condition. The eligibility conditions is a of the occupied coarse points that may be selected according to at least one embodiment or variant discussed in relation with FIG. 18 or any of their combination.

In step 210, a data $I_{pred}$ is decoded from the bitstream B. The data $I_{pred}$ is representative of a selected predicting radius ($r_{pred}$) in the list of candidate radiuses L.

In step 220, the residual radius $r_{res}$ is decoded from the bitstream B.

In step 230, a (decoded) radius $r_1$, associated with a point of the point represented by the first occupied coarse point ($P_1$), is obtained based on the residual radius $r_{res}$ and a selected predicting radius $r_{pred}$ obtained from the data $I_{pred}$ and the list of candidate radiuses $L=\{r_2\}$.

In one embodiment of step 105, illustrated on FIG. 24, the list of candidate radiuses $L=\{r_2, r_3\}$ may further comprise at least one third radius $r_3$ associated with at least one third occupied coarse point $P_3$ having a third sensor index $\lambda_3$ equal to the first sensor index $\lambda_1$ and a third sample index $s_3$ lower than or equal to the first sample index $s_1$.

This embodiment is advantageous because it provides good predicting radiuses when new sensed points belong to a new object and good predicting radiuses when new sensed points belong to an object precedingly sensed.

Figure 27:
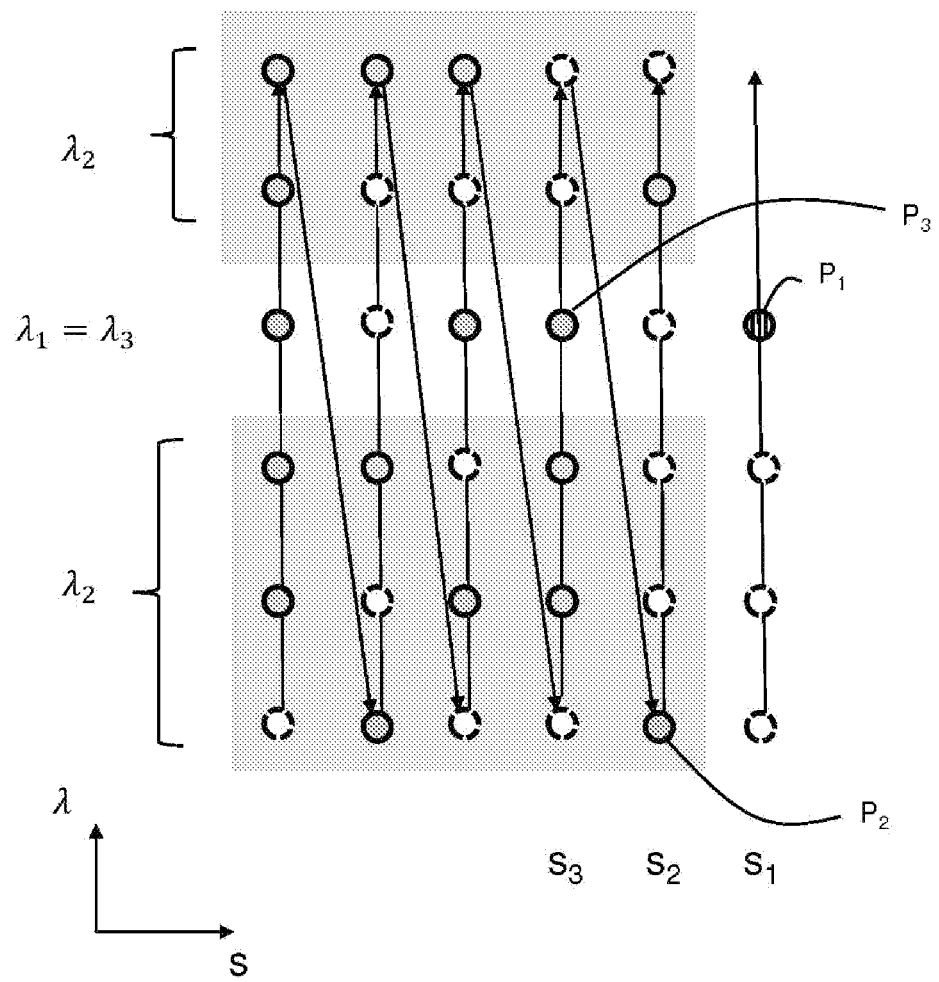
FIG. 27 shows schematically an example of coarse points belonging to a neighborhood of a first occupied coarse point in accordance with a variant of the methods 100 and 200.

In one embodiment of the variant of the methods 100 and 200, illustrated on FIG. 27, the eligibility condition may be based on a comparison between a second sample index $s_2$ of a second occupied coarse point $P_2$ and a third sample index $s_3$ of a third occupied coarse point $P_3$.

It is understood from simple geometry that, in case of sensed vertical plane, the dynamic of the residual radius $r_{res}$ relative to a predicting radius $I_{pred}$ is, in first approximation, proportional to the distance $|s_{pred}-s1|$ where $s_{pred}$ is the sampling index of the occupied second (or third) coarse point associated with the predicting radius $r_{pred}$.

In one variant, illustrated on FIG. 27, the eligibility condition may be fulfilled by the second occupied coarse point $P_2$ when the second sample index $s_2$ is greater than the third sample index $s_3$.

This embodiment allows a selection of an occupied second coarse point rather than a third occupied coarse point only if the occupied second coarse point fulfills the eligibility condition. In that case, the radius of the occupied second coarse point is a better predicting radius than the radius associated with the third occupied coarse point because the occupied second coarse point has been sensed later than the occupied third coarse point.

In one embodiment of the variant of the methods 100 and 200, the eligibility condition may be based on a comparison of azimuthal angles associated with sensors used to sense points of the point cloud associated with the first, second and third occupied coarse points.

This embodiment used comparison of azimuthal angles associated with the occupied coarse points to determine whether a second or a third coarse points has to be selected for predicting the first radius $r_1$. This embodiment is advantageous because comparing azimuthal angles provides better precision than comparing sampling indices.

In one embodiment of the variant of the methods 100 and 200, the eligibility condition may be fulfilled by a second occupied coarse point $P_2$ when a first azimuthal angle difference A1 is lower than a second azimuthal angle difference A2. The first azimuthal angle difference A1 is a difference between a first azimuthal angle $\phi_1$ associated with the first occupied coarse point $P_1$ and a second azimuthal angle $\phi_2$ associated with the second occupied coarse point $P_2$:

$$A_1 = |\phi_1 - \phi_2|$$

The second azimuthal angle difference A2 is a difference between the first azimuthal angle $\phi_1$ and a third azimuthal angle $\phi_3$ associated with the third occupied coarse point $P_3$:

$$A_2 = |\phi_1 - \phi_3|$$

For example, if A1>A2 then it is likely that the best prediction is the radius associated with the occupied third coarse point, so the occupied second coarse point is not eligible. In the reverse (A1<A2) the occupied second coarse point is eligible.

In one embodiment of the variant of the methods 100 and 200, an eligibility condition may be fulfilled by a second occupied coarse point $P_2$ when a distance $D_3$ is greater than a threshold th1:

$$D_3 > th_1$$

This embodiment is advantageous because it selects the radius associated with the second occupied coarse point $P_2$ only if the gain expected from a selected predicted radius equals to the radius $r_2$ is unlikely to compensate the cost of the extra syntax signaling the use of the radius $r_2$.

The distance $D_3$ may be calculated between a second radius $r_2$ associated with the second occupied coarse point $P_2$ and a third radius $r_3$ associated with a third occupied coarse point $P_3$:

$$D_3 = |r_2 - r_3|$$

In one variant, the occupied third coarse point $P_3$ in the calculated distance $D_3$ may be the closest occupied coarse point, i.e. the occupied third coarse point that minimizes the distance between the third sample index $s_3$ of the occupied third coarse point $P_3$ and the first sample index $s_1$.

In one embodiment of the variant of the methods 100 and 200, the threshold th1 may be fixed.

In one variant, the threshold th1 may be based on precedingly encoded or decoded residual radius $r_{res}$ associated with occupied coarse points having sensor index equal to the first sensor index $\lambda_1$.

For example, the threshold th1 may be obtained from the average of amplitudes $|r_{res}|$ of a number of precedingly encoded/decoded residual radiuses $r_{res}$ for a same sensor index.

This variant is advantageous because it adapts the threshold th1 to an average quality of prediction of the radiuses.

In one embodiment of the variant of the methods 100 and 200, an eligibility condition may be fulfilled by a second occupied coarse point $P_2$ when a ratio of a gradient of radius over a gradient of sample indices estimated from at least two precedingly encoded/decoded second occupied coarse points $P_{O,1}$ and $P_{O,2}$, is greater than a threshold:

$$\frac{d_r}{d_s} = \frac{r_{O1} - r_{O2}}{s_{O1} - s_{O2}} > th2$$

In one variant, in order to lower the sensitivity to noise, the estimate of the gradients of radius and sample indices may use more than two precedingly encoded/decoded second occupied coarse points.

This embodiment is advantageous because it selects the radius associated with the second occupied coarse point $P_2$ only if the sensed point associated with the second occupied coarse point $P_2$ does not belong to a plane essentially perpendicular to the sensing direction, i.e. when the gradient dr/ds is small. Then, in case the point belongs to a plane that is essentially perpendicular to the sensing direction, there is no (in first approximation) variation of the radius associated with successive sensed points as a function of the azimuthal angle $\phi$ and thus little variation as a function of the sampling index s. In this case, a predicting radius being equal to a radius associated with a third occupied coarse point $P_3$ is likely to provide better encoding performance than a predicting radius being equal to a radius associated with a second occupied coarse point $P_2$.

In one embodiment of the variant of the methods 100 and 200, the threshold th2 may correspond to a minimum angle $\alpha_{min}$ between a sensing direction and a normal direction to a sensed plane.

$$th2 = \tan(\alpha_{min})$$

For example, a value like $\alpha_{min}=20°$ may be chosen.

Once at least one second radius $r_2$ has been obtained and confirmed to be eligible, the encoder selects a best predictor among third radiuses $r_3$ and the at least one eligible second radius $r_2$. The data I(pred) must be sent to the decoder such that the decoder knows which predictor has been used.

In one embodiment of step 120 or 210, the data $I_{pred}$ indicating if the selected predicting radius $r_{pred}$ is equal to either a second radius $r_2$ or a third radius $r_3$.

In one embodiment of step 120 or 210, the data $I_{pred}$ may comprise a binary data b indicating if the selected predicting radius $r_{pred}$ is either a second radius $r_2$ or a third radius $r_3$.

For example, the binary data b equals 0 to indicate that the selected predicting radius $r_{pred}$ is a second radius $r_2$ and equals 1 to indicate that the selected predicting radius $r_{pred}$ is a third radius $r_3$.

In one embodiment of step 120 or 210, the at least one second radius 12 may form a first list of radiuses $L_1=\{r_2\}$ and the at least one third radius $r_3$ may form a second list of radiuses $L_2=\{r_3\}$. Then, the binary data b may indicate if the selected predicting radius $r_{pred}$ belongs to either the first or the second list of radiuses.

In one embodiment of step 120 or 210, the data $I_{pred}$ may further comprise a predictor index Idx indicating which radius among the first or the second list of radiuses the selected predicting radius $r_{pred}$ is equal to.

Figure 28:
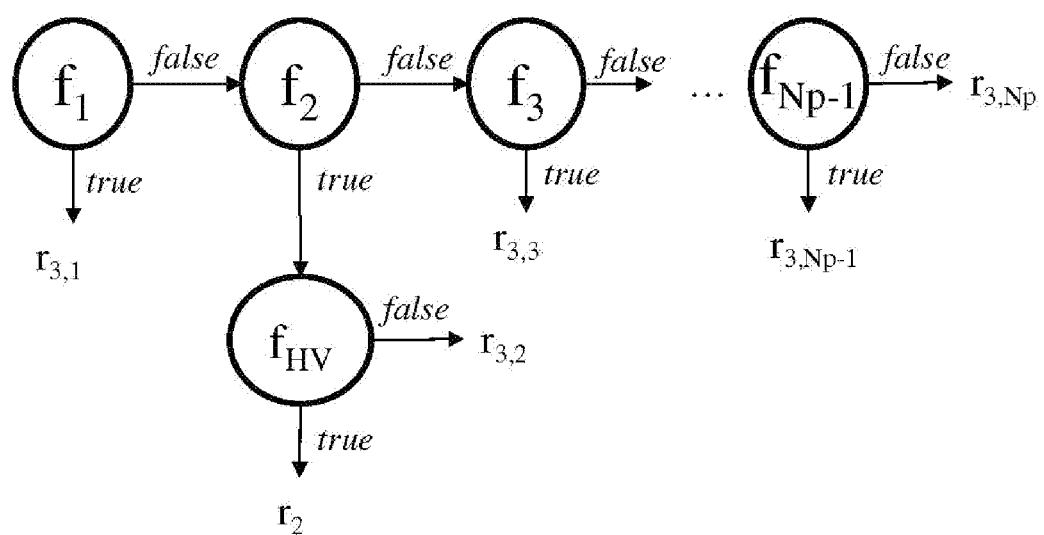
FIG. 28 shows schematically an encoding/decoding of a predictor index in accordance with at least one embodiment.

In one embodiment of step 120 or 210, illustrated on FIG. 28, the selected predicting radius $I_{pred}$ may be selected among a single second radius $r_2$ and a list $L=\{r_{3,i}\}$ of $N_p$ third radiuses $r_{3,i}$ ($N_p \geq 1$). The data ($I_{pred}$) comprises a predictor index Idx such that if the predictor index Idx is not equal to a predetermined index value $Idx_V$ then the predictor index Idx indicates which radius $r_3$ among the list the selected predicting radius $r_{pred}$ is equal to; otherwise the data $I_{pred}$ further comprises a binary data $f_{HV}$ indicating if the selected predicting radius $r_{pred}$ is equal to either the second radius $r_2$ or a third radius $r_3$ indicated by the predetermined index value $Idx_V$ in the list of radiuses.

According to this embodiment, the predictor index Idx is coded first followed optionally by the binary data $f_{HV}$ in case the predictor index Idx is equal to the predetermined index value $Idx_V$.

The index Idx may be unary coded by a series of binary data $f_i$.

For example, the predictor index Idx comprises a binary data $f_1$ (FIG. 28). If the binary data $f_1$ equals 1 (true), the predictor index Idx equals 1 and the predictor Idx indicates the radius $r_{3,1}$ in the list of radiuses. If $f_1=0$ and $f_2=1$ then the predictor index Idx equals 2 and Idx equals a predetermined index value $Idx_V$ (=2), and then the data $I_{pred}$ also comprises the binary data $f_{HV}$ that indicates the radius $r_{3,2}$ in the list of radiuses if $f_{HV}=0$ and the single second radius $r_2$ otherwise. If $f_1=0$, $f_2=0$ and $f_3=1$ then the predictor index Idx equals 3, and indicates the radius $r_{3,3}$ in the list of radiuses, etc.

By doing so, priority is given to the radius $r_{3,i}$ having indices lower than the predetermined index value $Idx_V$. This is advantageous because it has been observed that a third radius associated with the closest third occupied coarse point is more likely to become the best predictor than a second radius associated with a second occupied coarse point.

In the example of FIG. 28, the predetermined index value $Idx_V$ is equal to 2 such that only the third radius $r_{3,1}$ associated with closest third occupied coarse points is given priority.

In case the list of predictors has indices in the range $0 \ldots N_p-1$, the predetermined index value $Idx_V$ is equal to 1 (instead of 2).

In one embodiment of step 120 or 210, the at least one second radius $r_2$ and at least one third radius $r_3$ may form a single list of radiuses $L=\{r_2, r_3\}$, and the data $I_{pred}$ comprises a predictor index indicating which radius among the list of radiuses the selected predicting radius $r_{pred}$ is equal to.

This single list of radiuses may be built by "competition" between predicting radiuses. In practice, local statistics depending for example on the occupied coarse point position relative to the first occupied coarse point $P_1$, may be obtained from the selection of all predicting radiuses from precedingly encoded/decoded points.

In one variant, the radiuses of the single list of radiuses are ordered from the statistically most selected one to the least selected one.

Radiuses of the list of radiuses L are then ordered from the most selected one to the least selected one. This variant allows for the use of several radius associated with occupied second coarse points and adapts locally to the structure of the point cloud.

Figure 29:
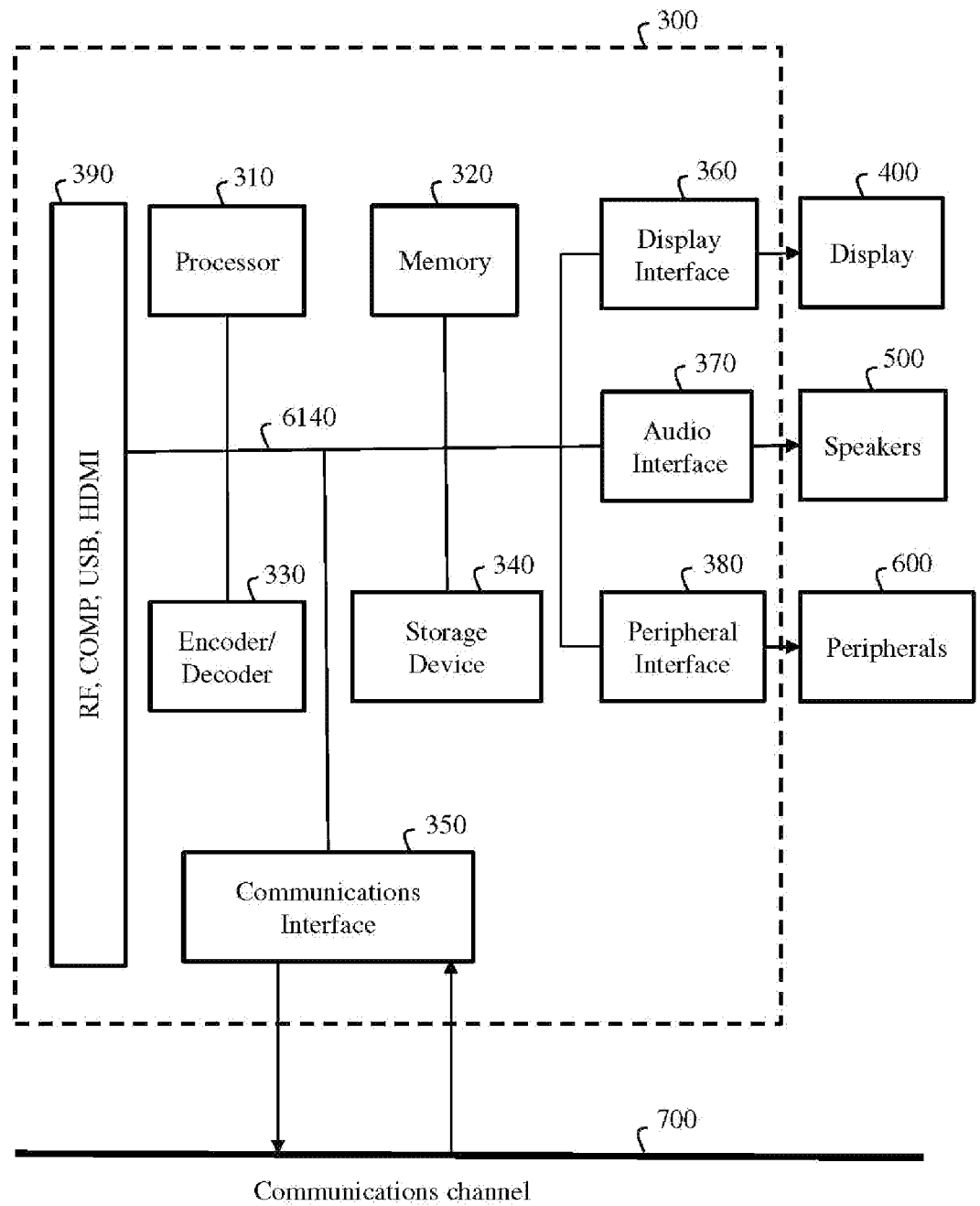
FIG. 29 illustrates a schematic block diagram of an example of a system in which various aspects and embodiments are implemented.

FIG. 29 shows a schematic block diagram illustrating an example of a system in which various aspects and embodiments are implemented.

System 300 may be embedded as one or more devices including the various components described below. In various embodiments, the system 300 may be configured to implement one or more of the aspects described in the present disclosure.

Examples of equipment that may form all or part of the system 300 include personal computers, laptops, smartphones, tablet computers, digital multimedia set top boxes, digital television receivers, personal video recording systems, connected home appliances, connected vehicles and their associated processing systems, head mounted display devices (HMD, see-through glasses), projectors (beamers), "caves" (system including multiple displays), servers, video encoders, video decoders, post-processors processing output from a video decoder, pre-processors providing input to a video encoder, web servers, set-top boxes, and any other device for processing a point cloud, a video or an image or other communication devices. Elements of system 300, singly or in combination, may be embodied in a single integrated circuit (IC), multiple ICs, and/or discrete components. For example, in at least one embodiment, the processing and encoder/decoder elements of system 300 may be distributed across multiple ICs and/or discrete components. In various embodiments, the system 300 may be communicatively coupled to other similar systems, or to other electronic devices, via, for example, a communications bus or through dedicated input and/or output ports.

The system 300 may include at least one processor 310 configured to execute instructions loaded therein for implementing, for example, the various aspects described in the present disclosure. Processor 310 may include embedded memory, input output interface, and various other circuitries as known in the art. The system 300 may include at least one memory 320 (for example a volatile memory device and/or a non-volatile memory device). System 300 may include a storage device 340, which may include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random-Access Memory (DRAM), Static Random-Access Memory (SRAM), flash, magnetic disk drive, and/or optical disk drive. The storage device 340 may include an internal storage device, an attached storage device, and/or a network accessible storage device, as non-limiting examples.

The system 300 may include an encoder/decoder module 330 configured, for example, to process data to provide encoded/decoded point cloud geometry data, and the encoder/decoder module 330 may include its own processor and memory. The encoder/decoder module 330 may represent module(s) that may be included in a device to perform the encoding and/or decoding functions. As is known, a device may include one or both encoding and decoding modules. Additionally, encoder/decoder module 330 may be implemented as a separate element of system 300 or may be incorporated within processor 310 as a combination of hardware and software as known to those skilled in the art.

Program code to be loaded onto processor 310 or encoder/decoder module 330 to perform the various aspects described in the present disclosure may be stored in storage device 340 and subsequently loaded onto memory 320 for execution by processor 310. In accordance with various embodiments, one or more of processor 310, memory 320, storage device 340, and encoder/decoder module 330 may store one or more of various items during the performance of the processes described in the present disclosure. Such stored items may include, but are not limited to, a point cloud frame, encoded/decoded geometry/attributes videos/images or portions of the encoded/decoded geometry/attribute video/images, a bitstream, matrices, variables, and intermediate or final results from the processing of equations, formulas, operations, and operational logic.

In several embodiments, memory inside of the processor 310 and/or the encoder/decoder module 330 may be used to store instructions and to provide working memory for processing that may be performed during encoding or decoding. In other embodiments, however, a memory external to the processing device (for example, the processing device may be either the processor 310 or the encoder/decoder module 330) may be used for one or more of these functions. The external memory may be the memory 320 and/or the storage device 340, for example, a dynamic volatile memory and/or a non-volatile flash memory. In several embodiments, an external non-volatile flash memory may be used to store the operating system of a television. In at least one embodiment, a fast external dynamic volatile memory such as a RAM may be used as working memory for video coding and decoding operations, such as for MPEG-2 part 2 (also known as ITU-T Recommendation H.262 and ISO/IEC 13818-2, also known as MPEG-2 Video), HEVC (High Efficiency Video coding), VVC (Versatile Video Coding), or MPEG-I part 5 or part 9.

The input to the elements of system 300 may be provided through various input devices as indicated in block 390. Such input devices include, but are not limited to, (i) an RF portion that may receive an RF signal transmitted, for example, over the air by a broadcaster, (ii) a Composite input terminal, (iii) a USB input terminal, and/or (iv) an HDMI input terminal.

In various embodiments, the input devices of block 390 may have associated respective input processing elements as known in the art. For example, the RF portion may be associated with elements necessary for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which may be referred to as a channel in certain embodiments, (iv) demodulating the down-converted and band-limited signal, (v) performing error correction, and (vi) demultiplexing to select the desired stream of data packets. The RF portion of various embodiments may include one or more elements to perform these functions, for example, frequency selectors, signal selectors, band-limiters, channel selectors, filters, downconverters, demodulators, error correctors, and de-multiplexers. The RF portion may include a tuner that performs various of these functions, including, for example, down-converting the received signal to a lower frequency (for example, an intermediate frequency or a near-baseband frequency) or to baseband.

In one set-top box embodiment, the RF portion and its associated input processing element may receive an RF signal transmitted over a wired (for example, cable) medium. Then, the RF portion may perform frequency selection by filtering, down-converting, and filtering again to a desired frequency band.

Various embodiments rearrange the order of the above-described (and other) elements, remove some of these elements, and/or add other elements performing similar or different functions.

Adding elements may include inserting elements in between existing elements, such as, for example, inserting amplifiers and an analog-to-digital converter. In various embodiments, the RF portion may include an antenna.

Additionally, the USB and/or HDMI terminals may include respective interface processors for connecting system 300 to other electronic devices across USB and/or HDMI connections. It is to be understood that various aspects of input processing, for example, Reed-Solomon error correction, may be implemented, for example, within a separate input processing IC or within processor 310 as necessary. Similarly, aspects of USB or HDMI interface processing may be implemented within separate interface ICs or within processor 310 as necessary. The demodulated, error corrected, and demultiplexed stream may be provided to various processing elements, including, for example, processor 310, and encoder/decoder module 330 operating in combination with the memory and storage elements to process the data stream as necessary for presentation on an output device.

Various elements of system 300 may be provided within an integrated housing. Within the integrated housing, the various elements may be interconnected and transmit data therebetween using suitable connection arrangement of block 390, for example, an internal bus as known in the art, including the I2C bus, wiring, and printed circuit boards.

The system 300 may include communication interface 350 that enables communication with other devices via communication channel 700. The communication interface 350 may include, but is not limited to, a transceiver configured to transmit and to receive data over communication channel 700. The communication interface 350 may include, but is not limited to, a modem or network card and the communication channel 700 may be implemented, for example, within a wired and/or a wireless medium.

Data may be streamed to the system 300, in various embodiments, using a Wi-Fi network such as IEEE 802.11. The Wi-Fi signal of these embodiments may be received over the communications channel 700 and the communications interface 350 which are adapted for Wi-Fi communications. The communications channel 700 of these embodiments may be typically connected to an access point or router that provides access to outside networks including the Internet for allowing streaming applications and other over-the-top communications.

Other embodiments may provide streamed data to the system 300 using a set-top box that delivers the data over the HDMI connection of the input in block 390.

Still other embodiments may provide streamed data to the system 300 using the RF connection of the input in block 390.

The streamed data may be used as a way for signaling information used by the system 300. The signaling information may comprise the bitstream B and/or information such a number of points of a point cloud, coordinates and/or sensor setup parameters.

It is to be appreciated that signaling may be accomplished in a variety of ways. For example, one or more syntax elements, flags, and so forth may be used to signal information to a corresponding decoder in various embodiments.

The system 300 may provide an output signal to various output devices, including a display 400, speakers 500, and other peripheral devices 600. The other peripheral devices 600 may include, in various examples of embodiments, one or more of a stand-alone DVR, a disk player, a stereo system, a lighting system, and other devices that provide a function based on the output of the system 300.

In various embodiments, control signals may be communicated between the system 300 and the display 400, speakers 500, or other peripheral devices 600 using signaling such as AV.Link (Audio/Video Link), CEC (Consumer Electronics Control), or other communications protocols that enable device-to-device control with or without user intervention.

The output devices may be communicatively coupled to system 300 via dedicated connections through respective interfaces 360, 370, and 380.

Alternatively, the output devices may be connected to system 300 using the communications channel 700 via the communications interface 350. The display 400 and speakers 500 may be integrated in a single unit with the other components of system 300 in an electronic device such as, for example, a television.

In various embodiments, the display interface 360 may include a display driver, such as, for example, a timing controller (T Con) chip.

The display 400 and speaker 500 may alternatively be separate from one or more of the other components, for example, if the RF portion of input in block 390 is part of a separate set-top box. In various embodiments in which the display 400 and speakers 500 may be external components, the output signal may be provided via dedicated output connections, including, for example, HDMI ports, USB ports, or COMP outputs.

Various methods are described herein, and each of the methods includes one or more steps or actions for achieving the described method. Unless a specific order of steps or actions is required for proper operation of the method, the order and/or use of specific steps and/or actions may be modified or combined.

Some examples are described with regard to block diagrams and/or operational flowcharts. Each block represents a circuit element, module, or portion of code which includes one or more executable instructions for implementing the specified logical function(s). It should also be noted that in other implementations, the function(s) noted in the blocks may occur out of the indicated order. For example, two blocks shown in succession may, in fact, be executed substantially concurrently or the blocks may sometimes be executed in the reverse order, depending on the functionality involved.

The implementations and aspects described herein may be implemented in, for example, a method or a process, an apparatus, a computer program, a data stream, a bitstream, or a signal. Even if only discussed in the context of a single form of implementation (for example, discussed only as a method), the implementation of features discussed may also be implemented in other forms (for example, an apparatus or computer program).

The methods may be implemented in, for example, a processor, which refers to processing devices in general, including, for example, a computer, a microprocessor, an integrated circuit, or a programmable logic device. Processors also include communication devices.

Additionally, the methods may be implemented by instructions being performed by a processor, and such instructions (and/or data values produced by an implementation) may be stored on a computer readable storage medium. A computer readable storage medium may take the form of a computer readable program product embodied in one or more computer readable medium(s) and having computer readable program code embodied thereon that is executable by a computer. A computer readable storage medium as used herein may be considered a non-transitory storage medium given the inherent capability to store the information therein as well as the inherent capability to provide retrieval of the information therefrom. A computer readable storage medium may be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present embodiments may be applied, is merely an illustrative and not an exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

An apparatus may be implemented in, for example, appropriate hardware, software, and firmware. Examples of such apparatus include personal computers, laptops, smartphones, tablet computers, digital multimedia set top boxes, digital television receivers, personal video recording systems, connected home appliances, head mounted display devices (HMD, see-through glasses), projectors (beamers), "caves" (system including multiple displays), servers, video encoders, video decoders, post-processors processing output from a video decoder, pre-processors providing input to a video encoder, web servers, set-top boxes, and any other device for processing a point cloud, a video or an image or other communication devices. As should be clear, the equipment may be mobile and even installed in a mobile vehicle.

Computer software may be implemented by the processor 310 or by hardware, or by a combination of hardware and software. As a non-limiting example, the embodiments may be also implemented by one or more integrated circuits. The memory 320 may be of any type appropriate to the technical environment and may be implemented using any appropriate data storage technology, such as optical memory devices, magnetic memory devices, semiconductor-based memory devices, fixed memory, and removable memory, as non-limiting examples. The processor 310 may be of any type appropriate to the technical environment, and may encompass one or more of microprocessors, general purpose computers, special purpose computers, and processors based on a multi-core architecture, as non-limiting examples.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The terminology used herein is for the purpose of describing particular embodiments only and is not intended to be limiting. As used herein, the singular forms "a", "an", and "the" may be intended to include the plural forms as well, unless the context clearly indicates otherwise. It will be further understood that the terms "includes/comprises" and/or "including/comprising" when used in this specification, may specify the presence of stated, for example, features, integers, steps, operations, elements, and/or components but do not preclude the presence or addition of one or more other features, integers, steps, operations, elements, components, and/or groups thereof. Moreover, when an element is referred to as being "responsive" or "connected" to another element, it may be directly responsive or connected to the other element, or intervening elements may be present. In contrast, when an element is referred to as being "directly responsive" or "directly connected" to other element, there are no intervening elements present.

It is to be appreciated that the use of any of the symbol/term "/", "and/or", and "at least one of", for example, in the cases of "A/B", "A and/or B" and "at least one of A and B", may be intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Various numeric values may be used in the present disclosure. The specific values may be for example purposes and the aspects described are not limited to these specific values.

It will be understood that, although the terms first, second, etc. may be used herein to describe various elements, these elements are not limited by these terms. These terms are only used to distinguish one element from another. For example, a first element could be termed a second element, and, similarly, a second element could be termed a first element without departing from the teachings of this application. No ordering is implied between a first element and a second element.

Reference to "one embodiment" or "an embodiment" or "one implementation" or "an implementation", as well as other variations thereof, is frequently used to convey that a particular feature, structure, characteristic, and so forth (described in connection with the embodiment/implementation) is included in at least one embodiment/implementation. Thus, the appearances of the phrase "in one embodiment" or "in an embodiment" or "in one implementation" or "in an implementation", as well any other variations, appearing in various places throughout this application are not necessarily all referring to the same embodiment.

Similarly, reference herein to "in accordance with an "in embodiment/example/implementation" or "in an embodiment/example/implementation", as well as other variations thereof, is frequently used to convey that a particular feature, structure, or characteristic (described in connection with the embodiment/example/implementation) may be included in at least one embodiment/example/implementation. Thus, the appearances of the expression "in accordance with an embodiment/example/implementation" or "in an embodiment/example/implementation" in various places in the specification are not necessarily all referring to the same embodiment/example/implementation, nor are separate or alternative embodiment/examples/implementation necessarily mutually exclusive of other embodiments/examples/implementation.

Reference numerals appearing in the claims are by way of illustration only and shall have no limiting effect on the scope of the claims. Although not explicitly described, the present embodiments/examples and variants may be employed in any combination or sub-combination.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Although some of the diagrams include arrows on communication paths to show a primary direction of communication, it is to be understood that communication may occur in the opposite direction to the depicted arrows.

Various implementations involve decoding. "Decoding", as used in this application, may encompass all or part of the processes performed, for example, on a received point cloud frame (including possibly a received bitstream which encodes one or more point cloud frames) in order to produce a final output suitable for display or for further processing in the reconstructed point cloud domain. In various embodiments, such processes include one or more of the processes typically performed by a decoder. In various embodiments, such processes also, or alternatively, include processes performed by a decoder of various implementations described in this application, for example, As further examples, in one embodiment "decoding" may refer only to de-quantizing, in one embodiment "decoding" may refer to entropy decoding, in another embodiment "decoding" may refer only to differential decoding, and in another embodiment "decoding" may refer to combinations of de-quantizing, entropy decoding and differential decoding. Whether the phrase "decoding process" may be intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application may encompass all or part of the processes performed, for example, on an input point cloud frame in order to produce an encoded bitstream. In various embodiments, such processes include one or more of the processes typically performed by an encoder. In various embodiments, such processes also, or alternatively, include processes performed by an encoder of various implementations described in this application.

As further examples, in one embodiment "encoding" may refer only to quantizing, in one embodiment "encoding" may refer only to entropy encoding, in another embodiment "encoding" may refer only to differential encoding, and in another embodiment "encoding" may refer to combinations of quantizing, differential encoding and entropy encoding. Whether the phrase "encoding process" may be intended to refer specifically to a subset of operations or generally to the broader encoding process will be clear based on the context of the specific descriptions and is believed to be well understood by those skilled in the art.

Additionally, this application may refer to "obtaining" various pieces of information. Obtaining the information may include one or more of, for example, estimating the information, calculating the information, predicting the information, or retrieving the information from memory.

Further, this application may refer to "accessing" various pieces of information. Accessing the information may include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

Also, as used herein, the word "signal" refers to, among other things, indicating something to a corresponding decoder. For example, in certain embodiments the encoder signals a particular information such a number of points of the point cloud or coordinates or sensor setup parameters. In this way, in an embodiment the same parameter may be used at both the encoder side and the decoder side. Thus, for example, an encoder may transmit (explicit signaling) a particular parameter to the decoder so that the decoder may use the same particular parameter. Conversely, if the decoder already has the particular parameter as well as others, then signaling may be used without transmitting (implicit signaling) to simply allow the decoder to know and select the particular parameter. By avoiding transmission of any actual functions, a bit savings is realized in various embodiments. It is to be appreciated that signaling may be accomplished in a variety of ways. For example, one or more syntax elements, flags, and so forth are used to signal information to a corresponding decoder in various embodiments. While the preceding relates to the verb form of the word "signal", the word "signal" may also be used herein as a noun.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method of encoding, into a bitstream, point cloud geometry data sensed by at least one sensor associated with a sensor index, the point cloud geometry data being represented by ordered coarse points occupying some discrete positions of a set of discrete positions of a two-dimensional space, each occupied coarse point being located within the two-dimensional space by a sensor index associated with a sensor that sensed a point of the point cloud associated with the occupied coarse point, and a sample index associated with a sensing time instant at which the point of the point cloud has been sensed, each occupied coarse point being associated with a radius based on a distance of the point of the point cloud from a referential, wherein the method comprises:

obtaining a list of candidate radiuses (L={$r_2$}) for a first occupied coarse point ($P_1$) having a first sensor index ($\lambda_1$), a first sample index ($s_1$) and being associated with a first radius ($r_1$), the list of candidate radiuses comprising at least one second radius ($r_2$) associated with at least one second occupied coarse point ($P_2$) having a second sensor index ($\lambda_2$) different from the first sensor index ($\lambda_1$) and having a second sample index ($s_2$) lower than or equal to the first sample index ($s_1$), the at least one second occupied coarse point ($P_2$) further fulfilling at least one eligibility condition indicating that the radius associated with the at least one second occupied coarse point ($P_2$) is likely reducing a dynamic of a predictive residual radius ($r_{res}$) when the first radius ($r_1$) is predictively encoded;

selecting, for the first occupied coarse point ($P_1$), a selected predicting radius ($r_{pred}$) from the list of candidate radiuses (L={$r_2$});

encoding, in the bitstream, a data ($I_{pred}$) representative of the selected predicting radius ($r_{pred}$) in the list of candidate radiuses (L={$r_2$}); and predictively encoding, in the bitstream, a residual radius ($r_{res}$) between the first radius ($r_1$) and the selected predicting radius ($r_{pred}$).

2. A method of decoding, from a bitstream, point cloud geometry data sensed by at least one sensor associated with a sensor index, the point cloud geometry data being represented by ordered coarse points occupying some discrete positions of a set of discrete positions of a two-dimensional space, each occupied coarse point being located within the two-dimensional space by a sensor index associated with a sensor that sensed a point of the point cloud associated with the occupied coarse point, and a sample index associated with a sensing time instant at which the point of the point cloud has been sensed, each occupied coarse point being associated with a radius based on a distance of the point of the point cloud from a referential, wherein the method comprises:

obtaining a list of candidate radiuses (L={$r_2$}) for a first occupied coarse point ($P_1$) having a first sensor index ($\lambda_1$) and a first sample index ($s_1$) and being associated with a first radius ($r_1$), the list of candidate radiuses comprising at least one second radius ($r_2$) associated with at least one second occupied coarse point ($P_2$) having a second sensor index ($\lambda_2$) different of the first sensor index ($\lambda_1$) and having a second sample index ($s_2$) lower than the first sample index ($s_1$), the at least one second occupied coarse point ($P_2$) further fulfilling at least one eligibility condition indicating that a radius associated with the at least one second occupied coarse point ($P_2$) is promising for reducing a dynamic of a predictive residual radius ($r_{res}$) when the first radius ($r_1$) is predictively encoded;

decoding, from the bitstream, for a first occupied coarse point ($P_1$), a data ($I_{pred}$) representative of a selected predicting radius ($r_{pred}$) in the list of candidate radiuses (L={$r_2$});

decoding, from the bitstream, for the first occupied coarse point, a residual radius ($r_{res}$); and obtaining a radius ($r_1$) associated with a point of the point represented by the first occupied coarse point ($P_1$), based on the residual radius ($r_{res}$) and the selected predicting radius ($r_{pred}$) is obtained from the data ($I_{pred}$) and the list of candidate radiuses (L={$r_2$}).

3. The method of claims 1, wherein the list of candidate radiuses further comprises at least one third radius ($r_3$) associated with at least one third occupied coarse point ($P_3$) having a third sensor index ($\lambda_3$) equal to the first sensor index ($\lambda_1$) and a third sample index ($s_3$) lower than or equal to the first sample index ($s_1$).

4. The method of claim 3, wherein the eligibility condition is based on a comparison between a second sample index ($s_2$) of a second occupied coarse point ($P_2$) and a third sample index ($s_3$) of a third occupied coarse point ($P_3$).

5. The method of claim 4, wherein the eligibility condition is fulfilled by the second occupied coarse point ($P_2$) when the second sample index ($s_2$) is greater than the third sample index ($s_3$).

6. The method of claim 3, wherein the eligibility condition is based on a comparison of azimuthal angles associated with sensors used to sense points of the point cloud associated with the first, second and third occupied coarse points.

7. The method of claim 6, wherein the eligibility condition is fulfilled by a second occupied coarse point ($P_2$) when a first azimuthal angle difference is lower than a second azimuthal angle difference, the first azimuthal angle difference being a difference between a first azimuthal angle ($\phi_1$) associated with the first occupied coarse point ($P_1$) and a second azimuthal angle ($\phi_2$) associated with the second occupied coarse point ($P_2$), and the second azimuthal angle difference being a difference between the first azimuthal angle ($\phi_1$) associated with the first occupied coarse point ($P_1$) and a third azimuthal angle ($\phi_3$) associated with the third occupied coarse point ($P_3$).

8. The method of claim 1, wherein an eligibility condition is fulfilled by a second occupied coarse point ($P_2$) when a distance is greater than a threshold (th1), the distance being calculated between a second radius ($r_2$) associated with the second occupied coarse point ($P_2$) and a third radius ($r_3$) associated with a third occupied coarse point ($P_3$) having a third sensor index ($\lambda_3$) equal to the first sensor index ($\lambda_1$) and having a third sample index ($s_3$) lower than or equal to the first sample index ($s_1$), and the threshold (th1) being based on precedingly encoded or decoded residual radius ($r_{res}$) associated with occupied coarse points having sensor index equal to the first sensor index ($\lambda_1$).

9. The method of claim 1, wherein an eligibility condition is fulfilled by a second occupied coarse point ($P_2$) when a ratio of a gradient of radius over a gradient of sample indices estimated from at least two precedingly encoded or decoded second occupied coarse points, is greater than a threshold.

10. An apparatus of encoding, into a bitstream, point cloud geometry data sensed by at least one sensor associated with a sensor index, the point cloud geometry data being represented by ordered coarse points occupying some discrete positions of a set of discrete positions of a two-dimensional space, each occupied coarse point is located within the two-dimensional space by a sensor index associated with a sensor that sensed a point of the point cloud associated with the occupied coarse point, and a sample index associated with a sensing time instant at which the point of the point cloud has been sensed, each occupied coarse point is associated with a radius based on a distance of the point of the point cloud from a referential, wherein the apparatus comprises at least one processor configured to:

obtain a list of candidate radiuses (L={$r_2$}) for a first occupied coarse point ($P_1$) having a first sensor index ($\lambda_1$), a first sample index ($s_1$) and being associated with a first radius ($r_1$), the list of candidate radiuses comprises at least one second radius ($r_2$) associated with at least one second occupied coarse point ($P_2$) having a second sensor index ($\lambda_2$) different from the first sensor index ($\lambda_1$) and having a second sample index ($s_2$) lower than or equal to the first sample index ($s_1$), the at least one second occupied coarse point ($P_2$) further fulfilling at least one eligibility condition indicating that the radius associated with the at least one second occupied coarse point ($P_2$) is likely reducing a dynamic of a predictive residual radius ($r_{res}$) when the first radius is predictively encoded;

select, for the first occupied coarse point ($P_1$), a selected predicting radius ($r_{pred}$) from the list of candidate radiuses (L={$r_2$});

encode, in the bitstream, a data ($I_{pred}$) representative of the selected predicting radius ($r_{pred}$) in the list of candidate radiuses (L={$r_2$}); and predictively encode, in the bitstream, a residual radius ($r_{res}$) between the first radius ($r_1$) and the selected predicting radius ($r_{pred}$).

11. An apparatus of decoding, from a bitstream, point cloud geometry data sensed by at least one sensor associated with a sensor index, the point cloud geometry data being represented by ordered coarse points occupying some discrete positions of a set of discrete positions of a two-dimensional space, each occupied coarse point is located within the two-dimensional space by a sensor index associated with a sensor that sensed a point of the point cloud associated with the occupied coarse point, and a sample index associated with a sensing time instant at which the point of the point cloud has been sensed, each occupied coarse point is associated with a radius based on a distance of the point of the point cloud from a referential, wherein the apparatus comprises at least one processor configured to perform the method of claim 2.

12. A non-transitory storage medium carrying instructions of program code for executing the method of claim 1.

13. A non-transitory storage medium carrying instructions of program code for executing the method of claim 2.

14. The method of claims 2, wherein the list of candidate radiuses further comprises at least one third radius ($r_3$) associated with at least one third occupied coarse point ($P_3$) having a third sensor index ($\lambda_3$) equal to the first sensor index ($\lambda_1$) and a third sample index ($s_3$) lower than or equal to the first sample index ($s_1$).

15. The method of claim 14, wherein the eligibility condition is based on a comparison between a second sample index ($s_2$) of a second occupied coarse point ($P_2$) and a third sample index ($s_3$) of a third occupied coarse point ($P_3$).

16. The method of claim 15, wherein the eligibility condition is fulfilled by the second occupied coarse point ($P_2$) when the second sample index ($s_2$) is greater than the third sample index ($s_3$).

17. The method of claim 14, wherein the eligibility condition is based on a comparison of azimuthal angles associated with sensors used to sense points of the point cloud associated with the first, second and third occupied coarse points.

18. The method of claim 17, wherein the eligibility condition is fulfilled by a second occupied coarse point ($P_2$) when a first azimuthal angle difference is lower than a second azimuthal angle difference, the first azimuthal angle difference being a difference between a first azimuthal angle ($\phi_1$) associated with the first occupied coarse point ($P_1$) and a second azimuthal angle ($\phi_2$) associated with the second occupied coarse point ($P_2$), and the second azimuthal angle difference being a difference between the first azimuthal angle ($\phi_1$) associated with the first occupied coarse point ($P_1$) and a third azimuthal angle ($\phi_3$) associated with the third occupied coarse point ($P_3$).

19. The method of claim 2, wherein an eligibility condition is fulfilled by a second occupied coarse point ($P_2$) when a distance is greater than a threshold (th1), the distance being calculated between a second radius ($r_2$) associated with the second occupied coarse point ($P_2$) and a third radius ($r_3$) associated with a third occupied coarse point ($P_3$) having a third sensor index ($\lambda_3$) equal to the first sensor index ($\lambda_1$) and having a third sample index ($s_3$) lower than or equal to the first sample index ($s_1$), and the threshold (th1) being based on precedingly encoded or decoded residual radius ($r_{res}$) associated with occupied coarse points having sensor index equal to the first sensor index ($\lambda_1$).

20. The method of claim 2, wherein an eligibility condition is fulfilled by a second occupied coarse point ($P_2$) when a ratio of a gradient of radius over a gradient of sample indices estimated from at least two precedingly encoded or decoded second occupied coarse points, is greater than a threshold.

* * * * *